(12) United States Patent
Grosswald et al.

(10) Patent No.: US 6,337,045 B1
(45) Date of Patent: *Jan. 8, 2002

(54) METHOD FOR THE MANUFACTURE OF PHARMACEUTICAL CELLULOSE CAPSULES

(75) Inventors: Ralph R. Grosswald, Fairfield, IA (US); Jeffory B. Anderson, Springville; Clair S. Andrew, Provo, both of UT (US)

(73) Assignee: R. P. Scherer Technologies, Inc., Paradise Valley, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/896,873

(22) Filed: Apr. 21, 1997

Related U.S. Application Data

(63) Continuation of application No. 08/377,669, filed on Jan. 24, 1995, now Pat. No. 5,698,155, which is a continuation of application No. 07/893,091, filed on May 29, 1992, now abandoned, which is a continuation-in-part of application No. 07/708,023, filed on May 31, 1991, now abandoned.

(51) Int. Cl.[7] .......................... B29C 33/06; B29C 41/14; B29C 41/46
(52) U.S. Cl. ........................ 264/402; 264/405; 264/305; 264/310; 264/327; 264/297.8; 264/DIG. 37; 425/174.6; 425/272; 425/804
(58) Field of Search ................................ 264/299, 303, 264/304, 310, 311, 327, DIG. 37, 402, 297.7, 405, 297.8, 305; 425/174.6, 272, 804

(56) References Cited

U.S. PATENT DOCUMENTS

| | | | |
|---|---|---|---|
| 1,125,619 A | 1/1915 | Winchester | |
| 1,787,777 A | 1/1931 | Colton | |
| 1,978,829 A | 10/1934 | Wilkie | 34/12 |
| 2,526,683 A | 10/1950 | Murphy | 167/83 |
| 2,575,789 A | 11/1951 | Bogin | 18/25 |
| 2,671,245 A | 3/1954 | Kath | 18/25 |
| 3,617,588 A | 11/1971 | Langman | 264/25 |
| 3,794,453 A | 2/1974 | Padilla et al. | 425/270 |
| 4,001,211 A | 1/1977 | Sarkar | 536/84 |
| 4,627,808 A | 12/1986 | Hughes | 425/270 |
| 4,705,658 A | 11/1987 | Lukas | 264/25 |
| 4,917,885 A | 4/1990 | Chiba et al. | 424/78 |
| 4,993,137 A * | 2/1991 | Muto et al. | 29/451 |
| 5,116,551 A | 5/1992 | Davidson et al. | 264/26 |
| 5,698,155 A * | 12/1997 | Grosswald et al. | 264/402 |

FOREIGN PATENT DOCUMENTS

| | | |
|---|---|---|
| EP | 0056825 | 1/1981 |
| EP | 0102832 | 9/1983 |
| JP | 8027378 | 3/1980 |

* cited by examiner

Primary Examiner—Angela Ortiz

(57) ABSTRACT

A method and apparatus for manufacturing pharmaceutical capsules use an aqueous solution of a thermogelling cellulose ether composition and use capsule body pins and capsule cap pins as molds. The method involves heating the pins, dipping the pins into the solution to cause the solution to gelatinize on the surface of the pins, removing the pins and drying the gelatinized solution on the surface of the pins to form capsule bodies and capsule caps. Pins are heated pre-dip and post-dip to facilitate gelating. Counterflow air is applied to provide drying from the inside. Capsule parts are removed by gripping. Capsule parts may have a thick wall and a stiffening ring.

20 Claims, 15 Drawing Sheets

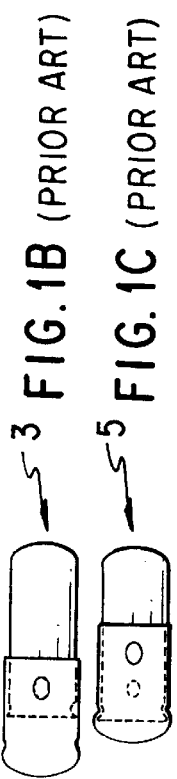
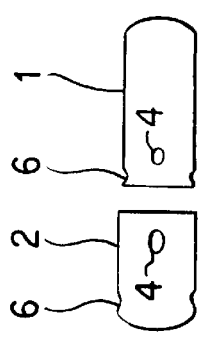
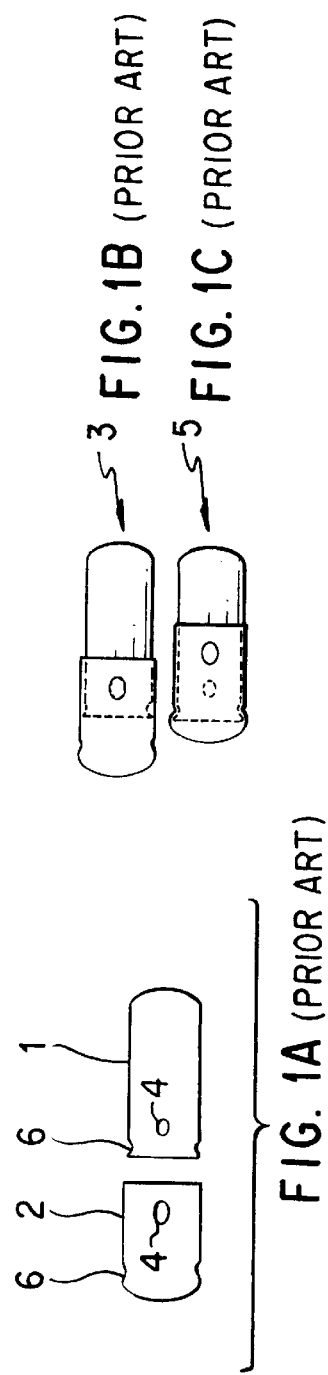
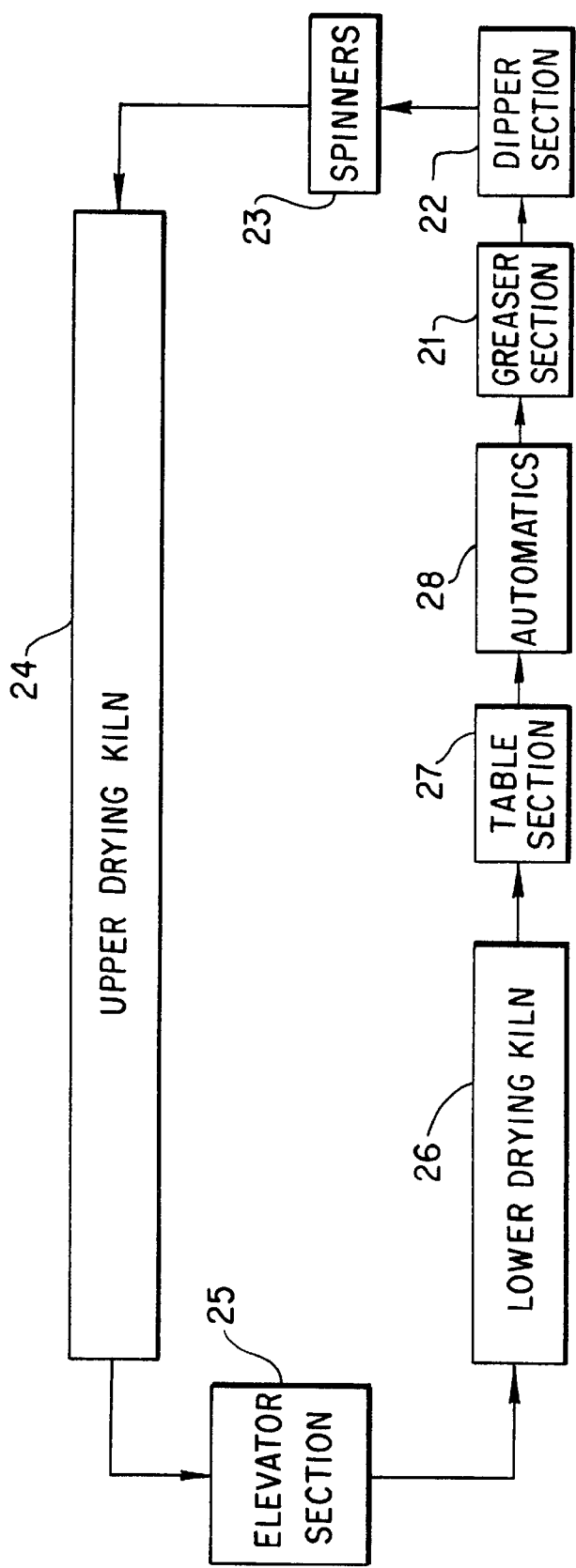

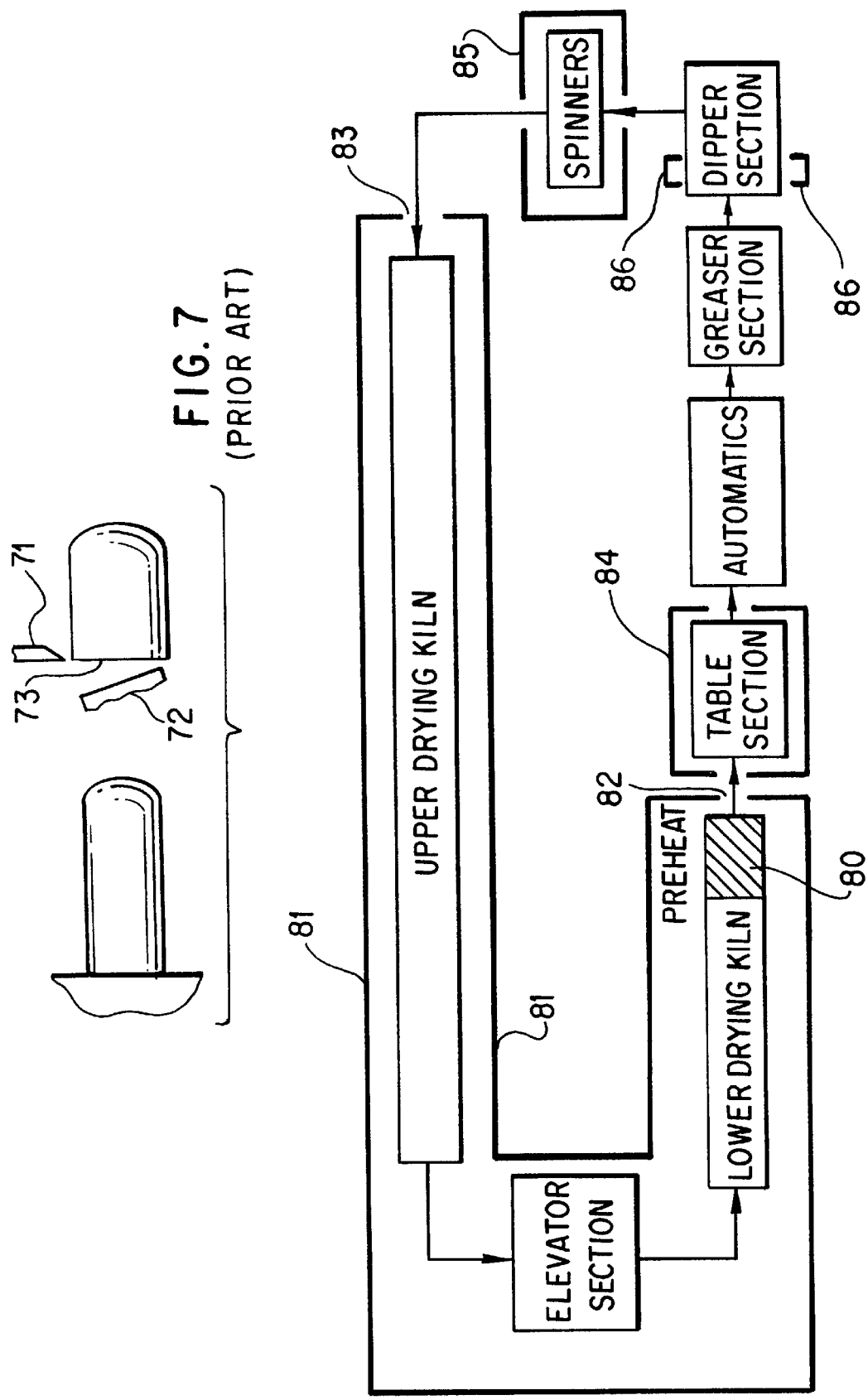

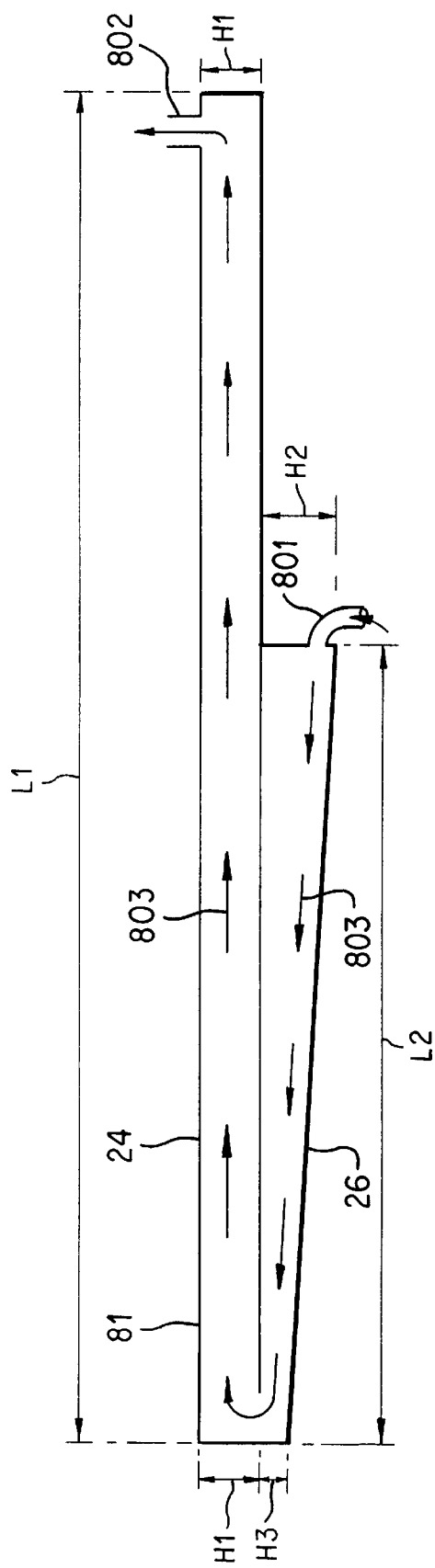
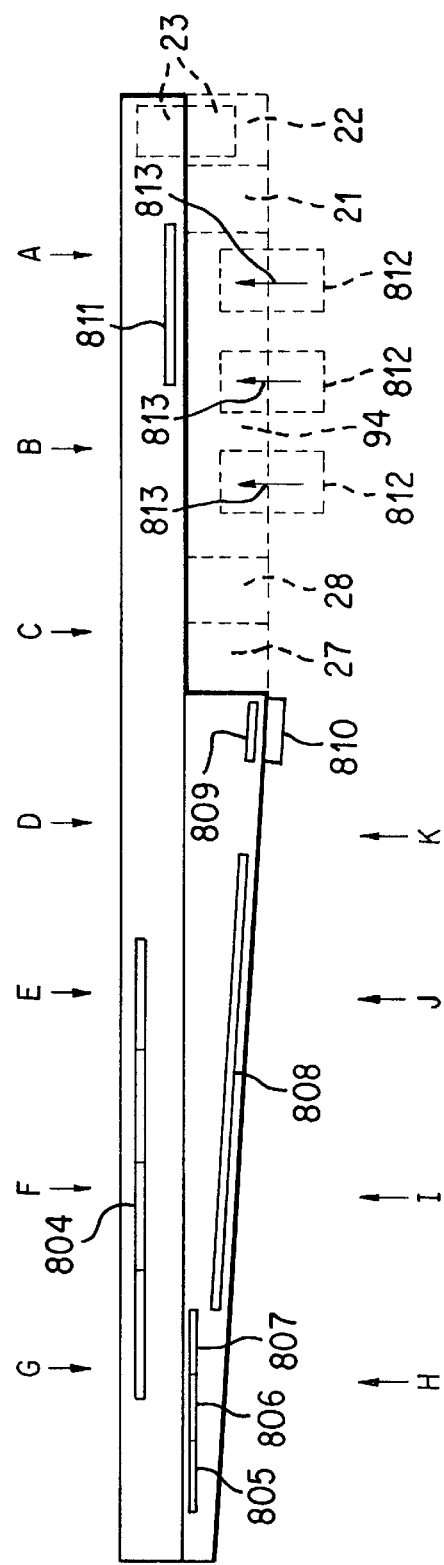
FIG. 8B
FIG. 8C

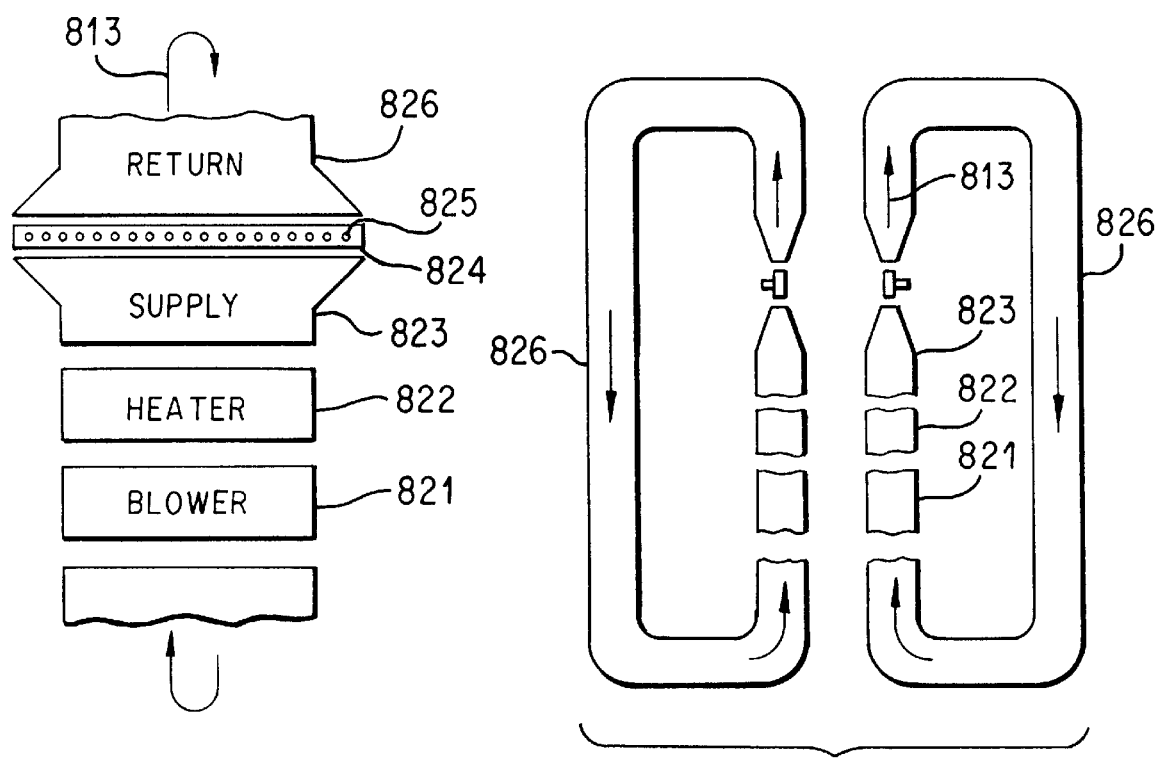
FIG. 8E
FIG. 8F
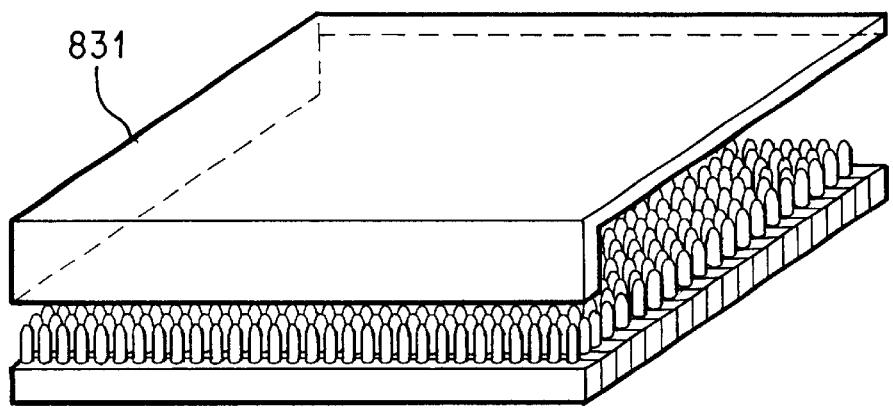
FIG. 8G

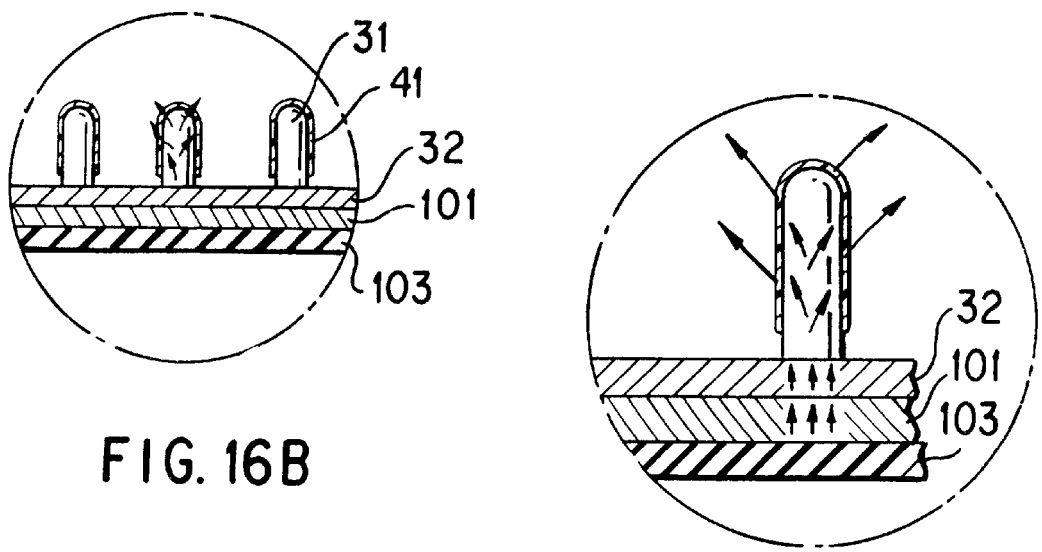
FIG. 16B
FIG. 16C
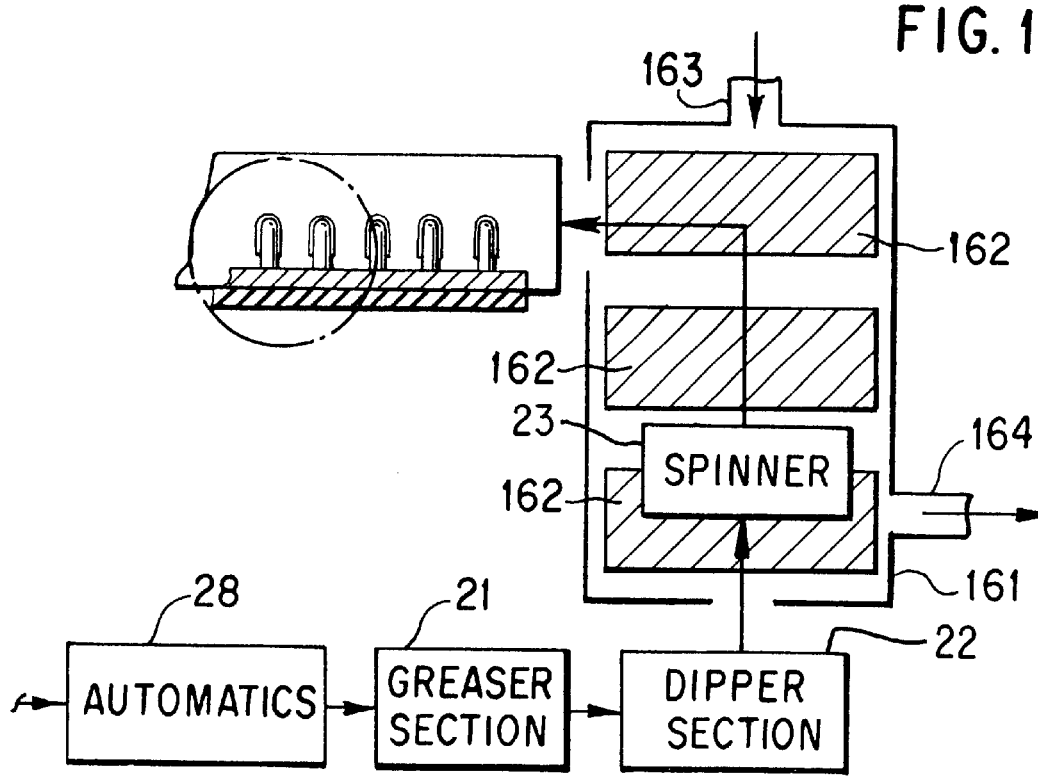
FIG. 16A

METHOD FOR THE MANUFACTURE OF PHARMACEUTICAL CELLULOSE CAPSULES

This application is a continuation application of U.S. Ser. No. 08/377,669, filed Jan. 24, 1995, now U.S. Pat. No. 5,698,155 which is a file-wrapper-continuing application of U.S. Ser. No. 07/893,091, filed May 29, 1992, now abandoned, which is a continuation-in-part of application Ser. No. 07/708,023, filed May 31, 1991 now abandoned.

TECHNICAL FIELD

The invention relates generally to methods and apparatus used in the manufacture of pharmaceutical capsules.

BACKGROUND OF THE INVENTION

Pharmaceutical capsules presently in general use are made of gelatin and the techniques for the manufacture of gelatin capsules are well developed. Compositions for cellulose capsules are also well known, but the first cellulose composition that was used commercially to manufacture cellulose capsules did not reliably break down in the user's digestive system. When this fact was discovered, the commercial manufacture of cellulose capsules was discontinued. An improved cellulose composition was later patented by Sarkar and several patents disclose methods for manufacturing cellulose capsules from the improved cellulose composition. However, in the fifteen years since the Sarkar patent issued, and in spite of many attempts, none have succeeded in manufacturing cellulose capsules in quantity, using the improved composition, with sufficient uniformity to be suitable for filling in modern high-speed filling machines. Until the present invention was made, cellulose capsules manufactured in quantity from the improved composition suffered imperfections such as wrinkles, starred ends and corrugations. These imperfections result in capsules either breaking, failing to separate, or jamming in the high-speed filling machine.

Prior Art Gelatin Capsules

Prior art gelatin capsules, as shown in FIGS. 1A, 1B and 1C, are made in a range of sizes including sizes listed in the first column of each of Tables 1 and 2. These tables are copied from the February, 1987 Specification Sheet of the CAPSUGEL Division of Warner-Lambert Company for its PRE-FIT™, SNAP-FIT™ and CONI-SNAP™ series of hard gelatin capsules. Table 1 shows the external diameter, obtained by optical measurements, of a body and a cap of each size of CAPSUGEL capsule. (Diameter is difficult to measure precisely because of the slightly tapered shape and the flexibility of the gelatin capsule parts.) Table 2 shows the target wall thickness of a body and a cap of each type and size of CAPSUGEL capsule. Table 3, copied from the Scherer LOX-IT™ specification sheet, gives the external diameter of the Scherer LOX-IT™ capsule caps and bodies in a range of sizes.

TABLE 1

CAPSUGEL CAPSULE PART, EXTERNAL DIAMETER
PRE-FIT ™ SNAP-FIT ™ or CONI-SNAP ™

| Sizes | Body Inches | Body mm | Cap Inches | Cap mm |
|---|---|---|---|---|
| 000 | 0.378 | 9.60 | 0.394 | 10.00 |
| 00 | 0.324 | 8.23 | 0.339 | 8.60 |
| 0 el | 0.291 | 7.38 | 0.300 | 7.70 |
| 0 | 0.291 | 7.38 | 0.303 | 7.70 |
| 1 | 0.263 | 6.68 | 0.275 | 6.98 |
| 2 | 0.241 | 6.13 | 0.252 | 6.41 |
| 3 | 0.221 | 5.61 | 0.231 | 5.88 |
| 4 el | 0.201 | 5.11 | 0.212 | 5.38 |
| 4 | 0.201 | 5.11 | 0.212 | 5.38 |
| 5 | 0.185 | 4.70 | 0.193 | 4.89 |

Tolerance: ±0.001 (±0.03 mm)

TABLE 2

CAPSUGEL CAPSULE PART, SINGLE WALL THICKNESS

| | PRE-FIT ™ | | | | SNAP-FIT ™ or CONI-SNAP ™ | | | |
|---|---|---|---|---|---|---|---|---|
| | Body | | Cap | | Body | | Cap | |
| Size | Inches | mm | Inches | mm | Inches | mm | Inches | mm |
| 000 | 0.0042 ± 0.0009 | 0.107 ± 0.023 | 0.0044 ± 0.0012 | 0.112 ± 0.030 | — | — | — | — |
| 00 | 0.0041 ± 0.0009 | 0.104 ± 0.023 | 0.0042 ± 0.0012 | 0.109 ± 0.030 | 0.0042 ± 0.0009 | 0.107 ± 0.023 | 0.0043 ± 0.0012 | 0.109 ± 0.030 |
| 0 el | — | — | — | — | 0.0041 ± 0.0008 | 0.104 ± 0.020 | 0.0042 ± 0.0010 | 0.107 ± 0.025 |
| 0 | 0.0040 ± 0.0008 | 0.102 ± 0.020 | 0.0042 ± 0.0010 | 0.107 ± 0.025 | 0.0041 ± 0.0008 | 0.104 ± 0.020 | 0.0042 ± 0.0010 | 0.107 ± 0.025 |
| 1 | 0.0039 ± 0.0008 | 0.099 ± 0.020 | 0.0041 ± 0.0010 | 0.104 ± 0.025 | 0.0040 ± 0.0008 | 0.102 ± 0.020 | 0.0041 ± 0.0010 | 0.104 ± 0.025 |
| 2 | 0.0038 ± 0.0008 | 0.096 ± 0.020 | 0.0040 ± 0.0010 | 0.102 ± 0.025 | 0.0039 ± 0.0008 | 0.099 ± 0.020 | 0.0040 ± 0.0010 | 0.102 ± 0.025 |
| 3* | 0.0034 ± 0.0008 | 0.086 ± 0.020 | 0.0036 ± 0.0010 | 0.092 ± 0.025 | 0.0035 ± 0.0008 | 0.089 ± 0.020 | 0.0036 ± 0.0010 | 0.092 ± 0.025 |
| 4 el | — | — | — | — | 0.0037 ± 0.0008 | 0.094 ± 0.020 | 0.0038 ± 0.0010 | 0.096 ± 0.025 |
| 4 | 0.0034 ± 0.0008 | 0.086 ± 0.020 | 0.0036 ± 0.0010 | 0.089 ± 0.025 | 0.0034 ± 0.0008 | 0.086 ± 0.020 | 0.0035 ± 0.0010 | 0.091 ± 0.025 |
| 5 | 0.0034 ± 0.0008 | 0.086 ± 0.020 | 0.0036 ± 0.0010 | 0.092 ± 0.025 | — | — | — | — |

3* SNAP-FIT ™ Body Target - 0.0034 ± 0.0008

TABLE 3

SCHERER LOX-IT ™ CAPSULE PART DIAMETER

| Size | 0 | 1 | 2 | 3 | 4 |
|---|---|---|---|---|---|
| CAP DIAMETER* (±0.003) | 0.301" | 0.272" | 0.250" | 0.230" | 0.210" |

TABLE 3-continued

SCHERER LOX-IT™ CAPSULE PART DIAMETER

| Size | 0 | 1 | 2 | 3 | 4 |
|---|---|---|---|---|---|
| BODY DIAMETER* (±0.003) | 0.289" | 0.262" | 0.240" | 0.220" | 0.200" |

*DETERMINED AT CUT EDGE

U.S. Pat. No. 3,399,803 to Oglevee et al. is directed to a hard-shell self-locking pharmaceutical capsule having a cap part and a body part, the parts adapted for machine filling. Oglevee discloses mold pins having a uniform taper or candle-shape such as to avoid suction when the part is removed from the pin and to provide a wedging fit between the capsule cap and the capsule body. Oglevee also discloses the shaping of the cap and body to provide a semi-locked position and a locked position. A single groove in the cap and a matching single groove in the body provide a mechanical lock.

U.S. Pat. Nos. 3,508,678 and 3,664,495 both to Graham et al. disclose a capsule cap having an indent, in addition to a locking groove, which defines a prelock position by providing either an elastic friction fit with the capsule body (U.S. Pat. No. 3,664,495) or a mechanical lock between the indent of the cap and the groove in the body (U.S. Pat. No. 3,508,678).

U.S. Pat. No. 4,247,006 to Bodenmann et al. discloses a capsule body having a reduced diameter in the area of its open end, and further the capsule cap and the capsule body each having an indentation to provide for a positive engagement of the body and the cap.

Prior Art Process for Gelatin Capsules

U.S. Pat. No. 1,787,777 to Colton describes the "Colton" machine used in the manufacture of gelatin capsules. Key elements in the prior art manufacture of gelatin capsules are illustrated in FIGS. 1–7. FIG. 1A shows the parts of a capsule having a body 1 and a cap 2. The parts are shown in FIG. 1B in a prelock position 3 held in position by prelock dimples 4. The parts are also shown in FIG. 1C in a filled position 5 held in position by locking rings 6. FIG. 2 shows elements of the traditional "Colton" capsule manufacturing machine. The elements are a greaser section 21, a dipper section 22, spinners 23, upper drying kiln 24, lower drying kiln 26, table section 27 and automatics 28. A pinbar, having thirty pins 31 mounted to a bar 32, is shown in FIG. 3. FIG. 4 shows gel 41 formed around a pin 31 to a dip line 42. Also shown is the trim line (cut-point) 43 and the area 44 on the pin above the dip line. FIG. 5 shows a prior art stripper 51 about to push a capsule part 53 off a pin from the area 44 above the dip line with pushing face 52. A side view of a prior art stripper having a pivot 61 and a spring 62 is shown in FIG. 6. FIG. 7 shows a knife 71 trimming a capsule part to remove the rough edge 72 and create a clean edge 73.

U.S. Pat. Nos. 1,978,829 (to Wilkie), 3,632,700 (to Oglevee), 3,794,453 (to Padilla et al.), 4,705,658 (to Lukas) and 4,997,359 (to Lebrun) are all directed to processes for manufacturing gelatin capsules. The Wilkie patent discloses an apparatus for drying capsules by directing a stream of air at the part of the capsule that contains the most moisture. A fine stream of air passing through a hole in a plate is directed to the closed end of the capsule so that a greater drying effect is experienced on the closed ends of the capsule than on the sides of the capsule. A plate is provided having multiple holes spaced to match the position of the pins. The Oglevee patent discloses a method for insuring capsule wall thickness uniformity by measuring the viscosity of the liquid gel solution in the dipping tank and causing corrective change in viscosity by changing the evaporative exposure or by adding lower viscosity gel to the tank. The Padilla patent discloses an air duct directing cooling air onto freshly dipped capsule mold pins for improved wall thickness characteristics. The duct is an air conduit for moving cool air upwardly against the rounded ends of the coated pins for uniform flow. The duct encloses a zone surrounding the array of pins. The Lukas patent is directed to reducing the drying time in the manufacture of hard shell gelatin capsules. Pins are irradiated with microwave energy until the gelatin dries. The Lebrun patent discloses a dipping bath, having a plurality of small wells and an impeller for maintaining the solution in the wells at a constant temperature. The pins dip into the wells.

Prior Art Capsule Forming Pins

U.S. Pat. No. 4,758,149 to Sauter is directed to a capsule forming pin having a cylindrical sidewall and a groove extending around the cylindrical sidewall, the groove having a non-angular cross-sectional profile, both the cylindrical sidewall and the groove having a smooth burnished-hardened surface. Sauter discloses in FIG. 3A, item C and column 4, line 45, that a prior-art capsule cap pin for a "0" ("zero") size capsule has a diameter at the cut-point of 0.2973–0.2978 inch (7.551–7.564 mm). The prior-art capsule body pin at the cut-point is 0.2848–0.2853 inch (7.234–7.247 mm).

For a range of popular sizes of gelatin capsules, Table 4 shows the nominal cut-point diameter for the prior art body pin and the prior art cap pin used in forming, respectively, the gelatin capsule body and the gelatin capsule cap.

TABLE 4

PIN CUT-POINT DIAMETER
PIN CUT-POINT DIAMETER

| | Body | | Cap | |
|---|---|---|---|---|
| Sizes | Inches | mm | Inches | mm |
| 00 | 0.3195 | 8.12 | 0.3355 | 8.52 |
| 0 | 0.2855 | 7.25 | 0.2975 | 7.56 |
| 1 | 0.2575 | 6.54 | 0.2685 | 6.82 |
| 2 | 0.2355 | 5.98 | 0.2455 | 6.24 |
| 3 | 0.2155 | 5.47 | 0.2255 | 5.73 |
| 4 | 0.1955 | 4.97 | 0.2045 | 5.19 |

Prior Art Process for Cellulose Capsules

An improved methyl cellulose ether composition that may be used in the present invention is disclosed in U.S. Pat. No. 4,001,211 to Sarkar. Sarkar also discloses a process for the manufacture of capsules from his improved methyl cellulose ether composition. The improved methyl cellulose ether composition disclosed by Sarkar is an aqueous solution of a thermal gelling methyl cellulose ether composition suitable for use in preparing pharmaceutical capsules by an aqueous dip coating process using preheated pins and having a methoxyl DS of about 1.5–2.0, a $C_2$–$C_3$ hydroxyalkyl MS of about 0.1–0.4, a 2 wt. percent aqueous solution viscosity of about 2–10 cps at 20° C. and a thermal gel point of about 50°–80° C., and a 15–30 wt. percent aqueous solution viscosity of about 1,000–10,000 cps at 20° C., said composition having as a 15–30 wt. percent aqueous solution: (A)

essentially Newtonian fluid properties as defined by a power law coefficient, n, of 0.9–1.0 at shear rates of between 0.1–10 sec$^{-1}$, and (B) a 50 sec gel yield strength of at least 150 dynes/cm$^2$ at 65° C.

U.S. Pat. No. 4,993,137 to Muto is directed to the manufacture of capsules made from the improved methyl cellulose ether composition of Sarkar. Muto discloses a process for gelling the solution by dipping solution-coated pins into thermally controlled water. In the Muto process, the solution is gelled on the surface of the pins by first dipping the pins into solution and thereby coating the pins with solution and then dipping the coated pins into heated water to set the gel.

U.S. Pat. Nos. 2,526,683 (to Murphy), 2,671,245 (to Kath), 3,617,588 (to Langman) and 3,842,242 (to Chisholm) are directed to methods of manufacture of capsules from methyl cellulose (the original methyl cellulose, not the improved methyl cellulose disclosed by Sarkar). The Murphy patent is the original patent for the manufacture of methyl cellulose capsules. This patent discloses the preheating of pins prior to dipping so that the solution adheres to pins in gelled form, the use of a sequence of different "successively warmer temperatures" through the drying kiln, drying using infrared lamps, and cooling by air. Murphy accomplished a mechanization for the manufacture of cellulose capsules. However this method was found to be inadequate when (later) it was applied to the improved cellulose of the Sarkar patent. The Kath patent discloses apparatus for manufacturing either gelatin or methyl cellulose capsules. It discloses the use of tracks and a plurality of pins. The pins are moved along the tracks and moved, rotated and gyrated as needed through the various stations. This patent contains detailed mechanical disclosure. The Langman patent is directed to elimination of unwanted thermal gelation in the coating bath by the use of low viscosity hydroxyalkayl cellulose ethers and the rapid immobilization of the dip coating by induction heating after removal of the pins from the bath. The Chisholm patent is directed to heating the pins prior to dipping and discloses apparatus for preheating capsule pins in a "Colton" capsule machine. A tray is provided containing spheroidal particles heated to a predetermined temperature. The pins are dipped into the heated particles just prior to being dipped in the solution.

The prior art for the manufacture of pharmaceutical capsules from the improved thermogelling methyl cellulose ether compositions disclosed in the Sarkar patent contain a number of unresolved problems. These unresolved problems include skinning, wrinkling, starred ends and corrugations in the wall of the capsule parts, and damage to the capsule parts occurring during removal from the pins. These problems cause breaking, failure to separate or jamming in the high-speed filling machines. There is no discussion in the prior art of the source of these problems.

None of the above mentioned patents disclose a method for making cellulose capsules of sufficient uniformity and rigidity that they may be filled on modern high-speed capsule filling machines. This uniformity and rigidity has now been accomplished using the process and capsule improvements that are the subject of the present invention.

SUMMARY OF THE INVENTION

A method and apparatus for manufacturing pharmaceutical capsules, each capsule consisting of a capsule body and a capsule cap, uses an aqueous solution of a thermogelling cellulose ether composition and uses capsule body pins and capsule cap pins as molds. A group of pins is mounted on a bar. The method involves heating the pins; dipping the pins into the solution to cause the solution to gelatinize on the surface of the pins; removing the pins from the solution; drying the gelatinized solution on the surface of the pins to form capsule bodies and capsule caps; and removing the capsule bodies and capsule caps from the pins. In one embodiment of the present invention, the time interval between heating and dipping may vary from bar to bar. To compensate, each bar is heated to a different temperature according to the time interval associated with the bar. Pins may be heated by radiant energy or by hot air or via the bar at a plurality of thermally isolated stations. Additionally a portion of the bar may be heated to a predetermined temperature. The process includes heating the pins before dipping and heating the pins after dipping. The dipping dishes for capsule bodies and capsule caps are spaced apart farther than in the traditional Colton machine and a pre-dip heating area is located between the dipping dishes. After the pins have been dipped and removed from the solution they are heated again to further gelatinize the solution on the surface of the pins. Drying the pins includes providing counterflow movement of air through an enclosure over the pins such that the pins initially encounter relatively humid air and, as they become drier, they encounter increasingly drier air. Also, the pins are heated so that the capsule bodies and capsule caps are dried from the inside-out. Removing the capsule parts from the pins involves gripping the capsule parts between opposing gripping surfaces. In one embodiment the capsule parts have a thicker wall than the equivalent size gelatin capsule and capsule bodies include a stiffening ring.

Problems in the prior art are overcome in one embodiment of the present invention as follows. In preheat, to compensate for differential cooling from some bars waiting longer than others to dip, thermally isolated heating elements are provided below the bars and radiant heaters are provided above the bars to allow selective heating of bars or portions of bars to eliminate temperature differences at the time of dip. To allow preheat in the dipper area without the problems associated with Chisholm's heated particle method, the dipping dishes are moved away from the centerline and thermal convection heaters and radiant heaters are inserted. For the same purpose, thermal conduction heating via the back of the bars is also provided. To achieve the level of uniformity necessary for high-speed filling and to eliminate the skinning over and wrinkling associated with the outside-in drying of the prior art due to air blowing directly over the pins, inside-out drying is provided. Post-dip heating is used in addition to pre-dip heating. Post-dip heating continues the gelling process after dip, assures rapid firming of the cellulose film, and supports inside-out drying. To avoid the uneven or excessively rapid drying that causes deformation in the prior art, an appropriate relationship is maintained between water vapor pressure in the capsules and water vapor pressure in the surrounding air through the drying process. A fully enclosed drying kiln is provided to support inside-out drying, humidity control of air surrounding the pins, and energy efficiency. To avoid damaging the open end of the capsule part during removal of the part from the pin, which often occurs when the prior art technique is used on cellulose capsule parts, a gripper is provided. To eliminate the jamming in the filling machines due to oversize parts, the pin is undersized to compensate for the unexpected differential in shrinkage between the cellulose capsule and the gelatin capsule. To avoid malfunction in filling machines caused by flexibility of the capsule part and deformation out of round, a pin is further undersized to allow a thicker capsule wall. Also the body pin adds an extra circumferential reinforcing ring to the capsule body between the lock ring and the dome.

BRIEF DESCRIPTION OF THE DRAWINGS

FIGS. 1A, 1B and 1C show a prior art capsule body and cap.

FIG. 2 shows the elements of the traditional (prior art) capsule manufacturing machine.

FIG. 7 shows a knife trimming the rough edge of the capsule (prior art).

FIG. 8A shows a schematic embodiment of the present invention, including a preheat section and a kiln enclosure.

FIG. 8B is a schematic cross-sectional elevation view of the drying kiln showing the enclosure and air flow.

FIG. 8C shows location of the heating elements and fans in the enclosure of FIG. 8B.

FIGS. 8E and 8F show two elevation views of the convection preheat system.

FIG. 8G shows the insulation box for the table section.

FIGS. 16A, 16B and 16C show apparatus for heating the pins through the pinbar to permit post-dip gelling in the spinner section and "inside-out drying" in the drying kiln.

DETAILED DESCRIPTION OF THE INVENTION

The present invention provides improvements over the method of manufacture of pharmaceutical capsules disclosed in U.S. Pat. No. 4,001,211 to Sarkar. The Sarkar cellulose composition is particularly suited for preparing pharmaceutical capsule shells which dissolve at a rate comparable to gelatin capsules. Delay release characteristics can be obtained by incorporation of a less water-soluble cellulose such as ethyl cellulose as described by Greminger and Windover in U.S. Pat. No. 2,887,440. In a preferred embodiment, the present invention uses the improved thermogelling methyl cellulose ether compositions disclosed in the Sarkar patent, including a thermal gelling methyl cellulose ether composition suitable for use in preparing pharmaceutical capsules by an aqueous dip coating process using preheated pins and having a methoxyl DS of about 1.5–2.0, a $C_2$–$C_3$ hydroxyalkyl MS of about 0.1–0.4, a 2 wt. percent aqueous solution viscosity of about 2–10 cps at 20° C. and a thermal gel point of about 50°–80° C., and a 15–30 wt. percent aqueous solution viscosity of about 1,000–10,000 cps at 20° C., said composition being further characterized by having as a 15–30 wt. percent aqueous solution: (A) essentially Newtonian fluid properties as defined by a power law coefficient, n, of 0.9–1.0 at shear rates of between 0.1–10 $sec^{-1}$, and (B) a 50 sec gel yield strength of at least 150 $dynes/cm^2$ at 65° C.

The apparatus of the present invention, in a preferred embodiment, is based on the type of capsule machine disclosed in U.S. Pat. No. 1,787,777 to Colton and U.S. Pat. No. 2,671,245 to Kath. The machine that was modified to embody the present invention was a "Colton" capsule machine manufactured by R & J Engineering Corporation, 100 Hansen Avenue, Kitchener, Ontario, Canada N2C 2 E2.

1. General

Figure 3:
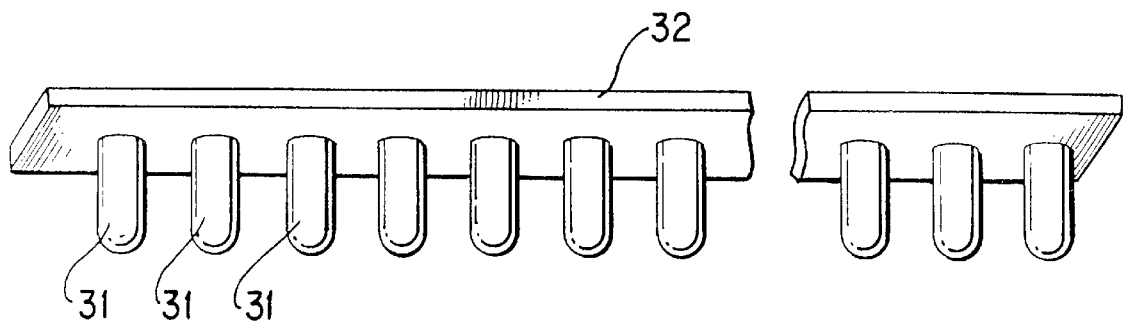
FIG. 3 shows pins mounted on a pinbar (prior art).
Figure 4:
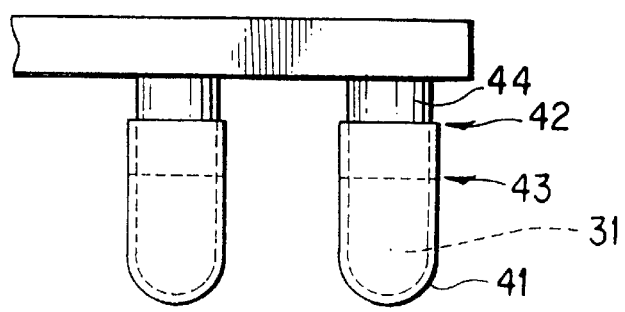
FIG. 4 shows a pin dipped to a dip line (prior art).

The present invention provides a production process and a fully mechanized production apparatus that may use the modified cellulose in U.S. Pat. No. 4,001,211 to Sarkar for manufacturing pharmaceutical capsules of sufficient uniformity and rigidity that they may be filled on modern high-speed capsule filling machines. Capsules may be made in a range of sizes similar to the range of sizes in Tables 1–3. For a given capsule the capsule bodies and capsule caps have different dimensions as illustrated for the prior art capsules in FIGS. 1A–1C. The process involves a series of steps performed by one machine. Each capsule part is made by dipping a hot stainless steel pin into a cellulose gel solution and drying the gel to form a hard film over the pin. The pins are mounted in a row on a bar as illustrated in FIG. 3. FIG. 4 shows a pin with a gel coating. Body pins are mounted on one set of bars and cap pins are mounted on a corresponding set of bars so that corresponding bodies and caps may pass through the entire process in phase with each other and emerge from the process facing each other positioned for assembly as a capsule.

The process, in a first embodiment, is arranged so that the bars travel in a continuous loop illustrated in FIG. 8A. The process steps in this embodiment are:

Preheating the pin bars (Preheat Section);

Oiling the pins (Greaser Section);

Dipping the pins into cellulose solution (Dipper Section);

Spinning the coated pins (Spinner Section);

Drying the gel (Upper and Lower Drying Kilns);

Positioning the pinbars so that corresponding caps and bodies face each other (Table Section);

Removing the caps and bodies (Automatics);

Trimming the caps and bodies (Automatics);

Joining caps and bodies into prelock position (Automatics).

Figure 17:
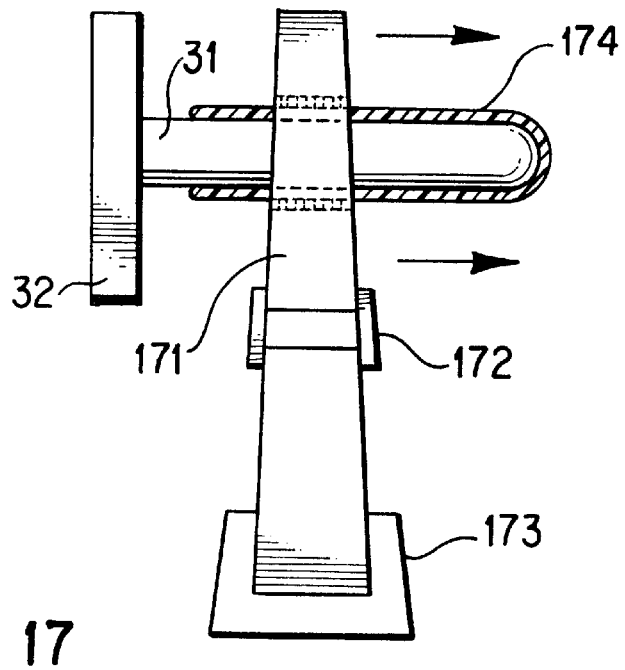
FIG. 17 illustrates the process of removing the capsule part from the pin.

Removing and trimming the caps and bodies is illustrated in FIGS. 17 and 7 respectively. Joining the caps and bodies to form a capsule in a prelock position, ready for filling, is illustrated in FIGS. 1A and 1B. FIG. 1C shows a capsule with the lock ring engaged as it would be after filling.

The process is similar to the process for manufacturing gelatin capsules except that the process for manufacturing gelatin capsules involves dipping cold pins into a gel whose temperature is above the gel point whereas the process for manufacturing cellulose capsules involves dipping hot pins into a gel whose temperature is below the gel point. Novel aspects of the present invention include process steps designed to overcome the peculiar difficulties of manufacturing cellulose capsules using the cellulose composition disclosed in the Sarkar patent. In a preferred embodiment, the present invention uses temperature, humidity and air flow control components including heaters, sensors, enclosures, fans and thermal isolation components. This embodiment also uses pins that are narrower than the pins used in the prior art and in one embodiment provides a capsule body having a stiffening ring.

2. Temperature Control

Capsules must have consistent wall thicknesses from capsule to capsule for them to be filled on high-speed filling machines. To accomplish this, the temperature of the stainless steel pin molds, which are attached to a pinbar, must be controlled throughout the process. The pins must be heated uniformly so that a repeatable amount of gel is picked up on each pin in the dipping operation. While several patents speak about the need to heat the pinbars prior to dip, none address the critical need for heating all pins from bar to bar to substantially the same temperature to produce capsules sufficiently uniform for high-speed filling. In the process of making cellulose capsules on a traditional "Colton" capsule machine, some pinbars must wait longer than others to dip. The present invention includes compensatory temperature control where some bars or parts of bars are independently heated to higher temperatures than others to compensate for the longer wait these bars have before dipping and for the different ambient temperature (due to temperature gradients within the machine) experienced during the wait, and also for temperature gradients resulting from differing pin, pinbar, and/or deck conductivities. The compensatory temperature control system operates to maintain predetermined temperatures in the bars prior to dipping to achieve substantially equal temperatures in the pins at the time of dipping. Compensatory temperature control can be provided by a variety of equipment configurations as follows:

a) Compensatory Sensing and Heating on Drying Decks

Groups of twenty bars move from drying station to drying station on a metal deck. Since bars sit in each position for some time before moving, heating sources may be positioned under the deck and also over the bars in such a manner so that heat may be applied to raise the temperature of selected bars in the group of twenty. The last station of the lower deck, just prior to the table section, provides separate heating areas that are thermally isolated from each other so as to heat bars and portions of bars selectively. When bars leave the drying decks and load onto the table section, they are fed one at a time into the center elevator for processing one at a time in the automatics section. The last bar in the group of twenty must wait the longest. By selectively heating these later bars to higher temperatures, the delay before dip is compensated for. At time of dip, these later bars will have a temperature substantially equal to the earlier bars that had less time to cool down before entering the dipping station.

b) Insulation and Compensatory Heating in Table Section

After leaving the drying decks, bars are fed from the deck onto a Table Section which takes the group of twenty bars and feeds them one at a time into the T-slides for continued processing. In this Table Section heat can be applied by any means to maintain the later bars at the required temperature so that they do not cool as they wait their turn for further processing. The table section is covered with an insulated box with heat sources to maintain temperatures and further accommodate the later bars so that all bars reach the dipping bath at substantially the same temperature.

c) Compensatory Sensing and Heating to Adjust for Temperature Variations from the Front of the Bar to the Back of the Bar Because of the temperature gradients within the machine, there is no guarantee (with the prior art machines) that the temperature along the length of a given bar will be constant. Variation of temperature along the length of the bar would cause temperature variation pin to pin. For example, the front end of the bar may be cooler than the back end, and thus pins in the front are also cooler. In the present invention, the differential heating mentioned above also may be set up to compensate for temperature gradients within the machine in order to ensure uniformity of temperature, pin to pin, along a given bar. This is accomplished by applying heat selectively via the deck supporting the bars and from overhead radiant heaters. The last station of the lower deck, just prior to the table section which delivers bars one at a time to the automatics, is known as the "split deck." Heating from each thermally isolated segment of the split deck is adjusted to produce a predetermined temperature profile that results in the temperature of all pins being equal when they reach the dipper.

3. Novel Approaches to Drying Cellulose Capsules After the Dipping Process a) Counterflow Drying and Enclosed Kilns Drying techniques used in prior art mechanized capsule manufacture involves overhead kilns with perforations on the bottom plate through which air blows over the capsules. The air then escapes into the room. The present invention uses enclosed kilns where air is only introduced at the pin-exit end of the lower kiln (i.e., the end of the drying process) and then proceeds in a counterflow direction to the pinbar movement, all air being contained in the enclosed kilns and being removed at the pin-entry end of the top kiln, which is the beginning point of the drying process. The pins, on entering the drying process, encounter relatively humid air and, as the pins move through the drying process and become drier, they encounter increasingly drier air.

b) Inside-Out Drying

All capsule drying was formerly accomplished by drying from the outside by blowing air over the pins from above. The present invention dries from the inside-out by using heat both from beneath the deck and also from above the pins (radiant or infrared, microwave, etc.) to heat the pins themselves, thus driving the moisture out from the inside. This gives more uniform capsules free from defects of wrinkles and corrugations common with outside-in drying, and avoids the case hardening or skinning over that occurs in cellulose capsule production by drying with air alone.

4. Novel Ways to Preheat Pinbars Prior to Dipping a) Adding a Separate Preheat Section to the Process Prior to Dip Heating the pins is necessary so that gel will be formed on the pins in the dipping bath. In the Murphy patent, pins are heated as a byproduct of the drying. The hot air used to dry the capsules also heated the pinbars (in a way that is uncontrolled with regard to pin-temperature requirements for dipping) before capsule removal and redipping. The only mention in the prior art of controlled preheating is the Chisholm patent which suggests that the pins be immersed in a bath of hot beads prior to dip. In practice the Chisholm approach is not feasible because of the problems discussed hereinbelow under "Analysis of the Problems in the Prior Art." For example, removal of capsules made from the improved cellulose from pins is even more difficult than removal of capsules made from gelatin from pins (also very difficult) because the improved cellulose forms a weaker and more flexible film. Because the walls of the capsule parts lack sufficient rigidity to be removed easily, the lubricant layer must be administered carefully and left intact. The present invention provides a preheat area whose specific purpose is to apply heat to the pins without contact in preparation for dipping This preheat area can be in any or all of the following places:

a) On the drying decks, or at the end of the drying decks and before the table section.

b) On the table section.

c) Between the table section and the automatic section.

d) After the automatic section and before the greasing section.

e) After the greasing section and before the dipping section by means that do not contact the pins.

f) In the dipping section by means that do not contact the pins, such as radiant heat, hot air, induction heat, contact elements to back side of bar, or other suitable method. Another problem with the Chisholm approach is that the traditional capsule machine does not have room to accommodate the procedure he recommends because of the close proximity of the dipping dishes to the centerline of the machine. Thus the present invention also includes extending the dipper section on both cap and body sides to move the dipping dishes further out from the centerline of the longitudinal axis of the traditional capsule machine. This allows space to accommodate a preheat process that does not involve contact with the pins.

5. Description of Apparatus

FIG. 8A shows some elements of a first schematic embodiment the apparatus of the present invention, most notably a preheat section 80, a kiln enclosure 81, with air ingress aperture 82 and air egress aperture 83, an insulated, heated table section enclosure 84, an insulated, heated spinner section enclosure 85 and a dipper section having a built-in preheat portion 86. The arrows in FIG. 8A indicate the direction of pin movement through the machine.

Figure 9:
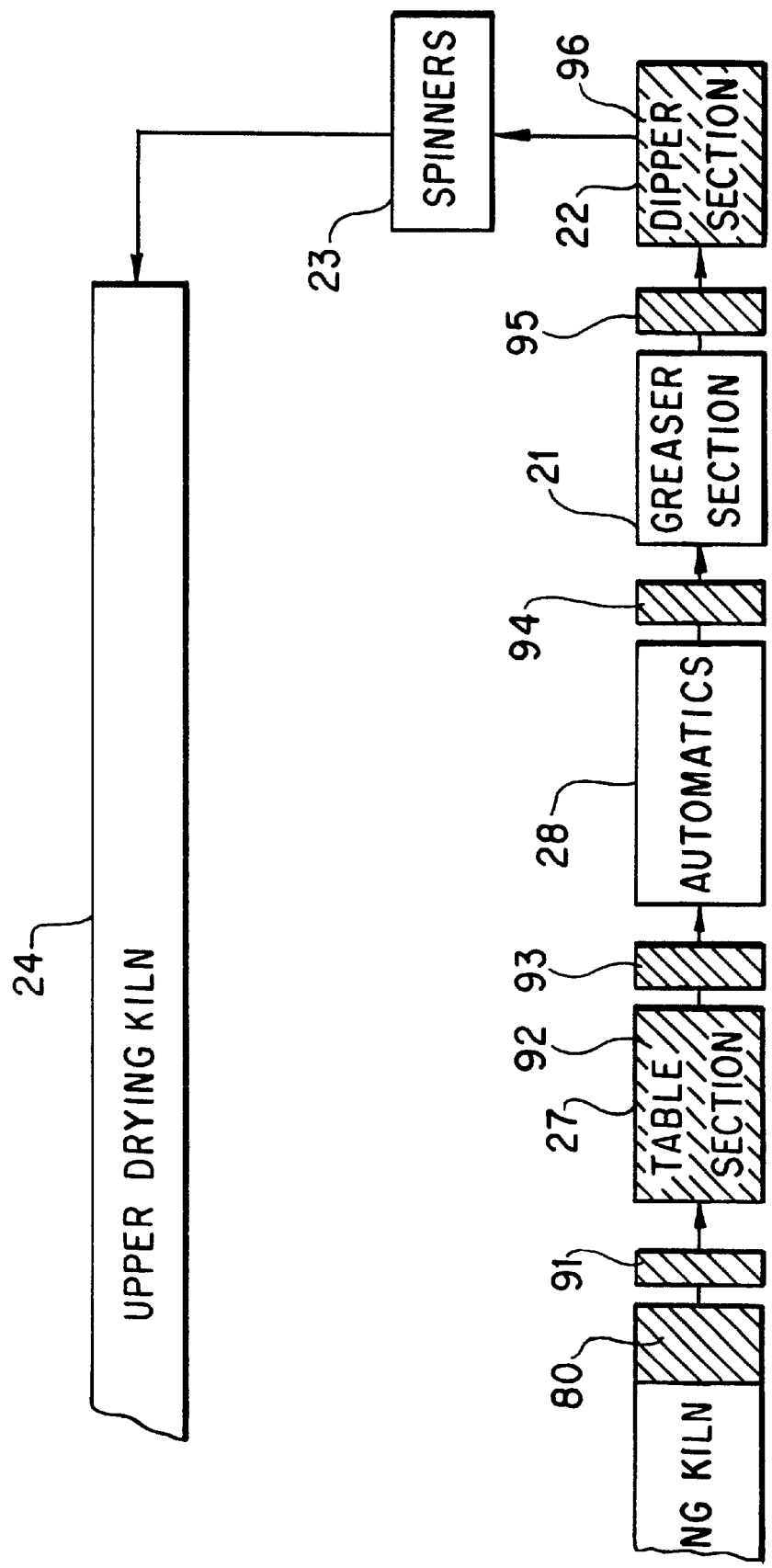
FIG. 9 shows a schematic embodiment of the present invention, including locations of the several preheat sections.

FIG. 9 shows a schematic embodiment of the apparatus of the present invention including several preheat sections, as follows: in the drying kiln 80, between the drying kiln and the table section 91, on the table section 92, between table and automatics 93, between automatics and greaser 94, between greaser and dipper 95, and in the dipper section 96.

FIG. 8B shows the overall physical shape of kiln. The overall length L1 of the machine, i.e., the length of the upper kiln, is 44 feet (13.4 m). This is longer than the traditional Colton machine, the upper kiln having been extended by three table-lengths to accommodate a new preheat section 94 (shown in FIG. 8C) between the automatics and the greaser. The height H1 of the upper kiln is 2 feet (61 cm). The length L2 of the lower kiln is 26 feet (7.9 m). The height H2 of the lower kiln at the split deck is 2 feet (61 cm) and the height H3 of the lower kiln at the back elevator is 1 foot (30 cm). The walls of the kiln are insulated.

The kiln comprises an enclosure 81 having air entrance duct 801 and air exit duct 802. The direction of air flow is indicated by arrows 803. FIG. 8C locates the two 6-inch (152-mm) circular duct fans 805 and the single 10-inch (254-mm) duct fan 807, all mounted in the lower kiln 26, which power the air flow though both kilns. The two duct fans 805 are mounted side by side so as to blow air in a direction substantially parallel to the axis of the lower kiln toward the back of the machine, drawing air from inlet 801 and driving it into the upper kiln 24. Eight 9-inch (229-mm) agitator fans 804 in the upper kiln are arranged in four pairs of side by side fans, each pair directed to blow air downwardly onto the pins so as to speed local drying of the gel with agitated (i.e., temperature-equalized) air. Three 9-inch (229-mm) fans 806 similarly mounted in the lower kiln dry the pins further.

Heat for inside-out drying and preheat is supplied by a series of five 22 inch by 17 inch (56 cm by 43 cm) radiant panels 808 mounted directly above the moving pinbars in the lower kiln. General preheat of the pinbars in the split deck position is provided from above by a 22 inch by 17 inch (56 cm by 43 cm) group of radiant panels 809 directly above the pinbars and preheat is applied selectively to portions of pinbars by conduction from the split deck assembly 810 that supports the pinbars. A "dome-setter" radiant panel 811 is provided for post-dip heating to facilitate post-dip gelling and inside-out drying.

The fan and heater configuration described above applies to one side, cap or body, and, in this respect, the cap and body sides are substantially identical, except that they are the mirror image of each other.

Inlet air temperature to the kiln is controlled in the range 125–180° F. and is preferably 160° F. Absolute humidity of the air at the inlet is controlled in the range 0.006–0.012 lb moisture/lb air (0.6–1.2 percent) and is preferably 0.009 lb moisture/lb air (0.9 percent). Air flow rate through the body side of the kiln is 63 feet/min (0.32 m/sec) measured at the 8 inch (203 mm) body side inlet duct. The corresponding flow rate through the cap side kiln measured at a cap side inlet duct of the same size is 7 feet/min (0.036 m/sec). Within the kiln the flowing air is cooled by evaporative cooling and is heated by heat from the bars and from the radiant panels. The temperature profile found to provide acceptable capsule parts is given in Table 5. Heat from the radiant panels and thermal conduction heaters is adjusted to maintain the predetermined temperatures of Table 5. Pressure drop across the kiln is 0.020 inches of water (0.005 kPa) (body side) and 0.005 inches of water (0.012 kPa) (cap side). This indicates how much greater the air flow rate through the body side is than the air flow rate through the cap side.

TABLE 5

ACCEPTABLE AIR TEMPERATURE PROFILE

| Location in Kiln | Body Kiln Air Temperature | | Cap Kiln Air Temperature | |
|---|---|---|---|---|
| | ° F. | ° C. | ° F. | ° C. |
| A | 111 | 43.9 | 111 | 43.9 |
| B | 109 | 42.8 | 108 | 42.2 |
| C | 110 | 43.3 | 107 | 41.7 |
| D | 110 | 43.3 | 106 | 41.1 |
| E | 111 | 43.9 | 104 | 40.0 |
| F | 114 | 45.6 | 104 | 40.0 |
| G | 120 | 48.9 | 105 | 40.6 |
| H | 123 | 50.6 | 112 | 44.4 |
| I | 142 | 61.1 | 140 | 60.0 |
| J | 151 | 66.1 | 159 | 70.6 |
| K | 149 | 65.0 | 147 | 63.9 |

Figure 10B:
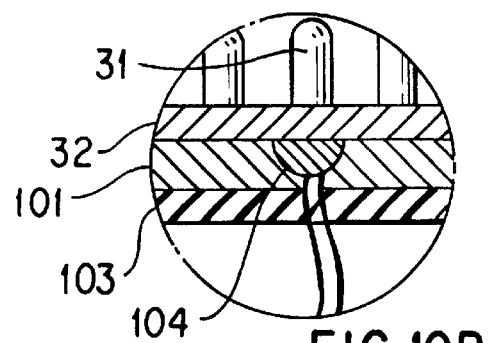
FIGS. 10A and 10B show temperature sensors and underdeck heaters associated with the split deck.
Figure 10A:
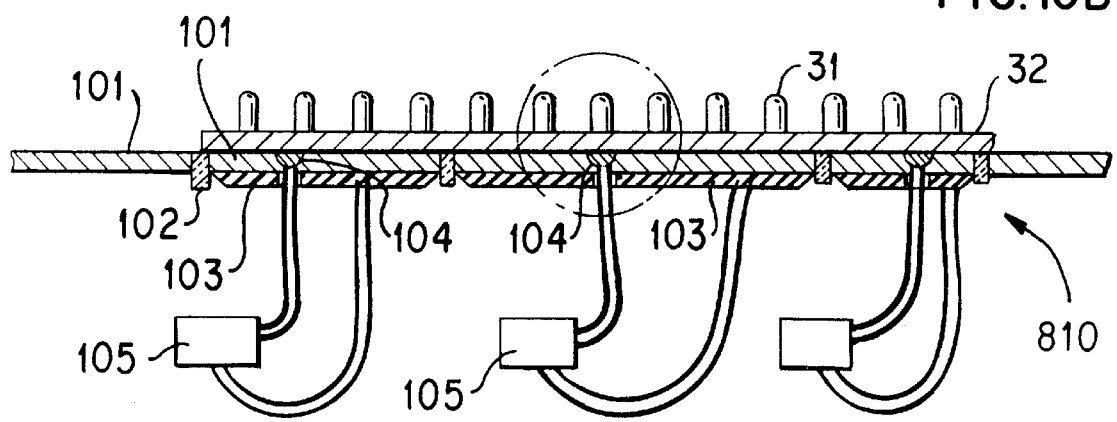
Figure 11:
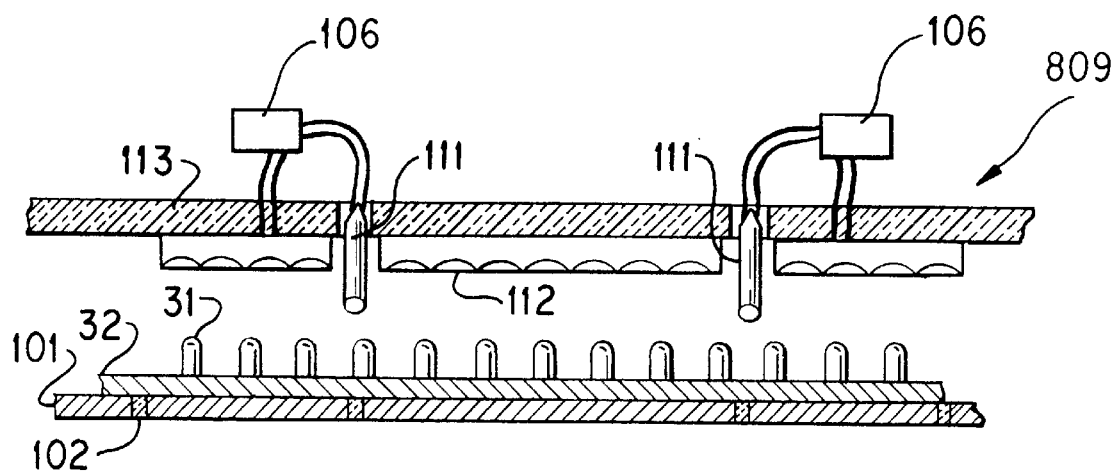
FIG. 11 shows non-contact temperature sensors and overhead heaters associated with the split deck.
Figure 10D:
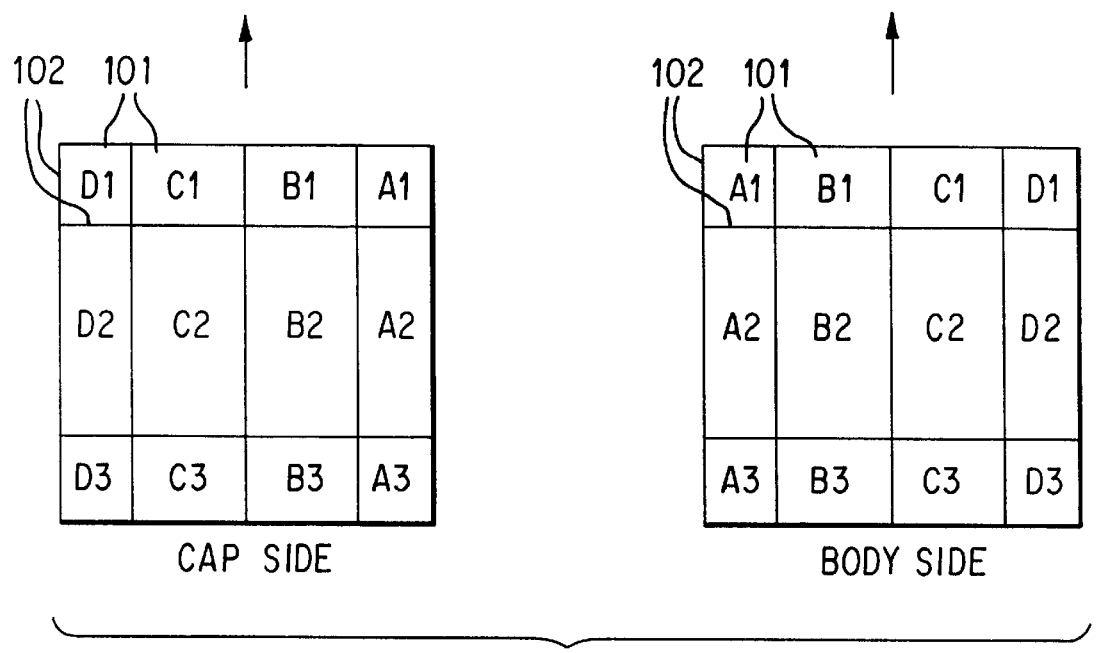
FIG. 10D shows the split deck layout for the bars of FIG. 10C.
Figure 10C:
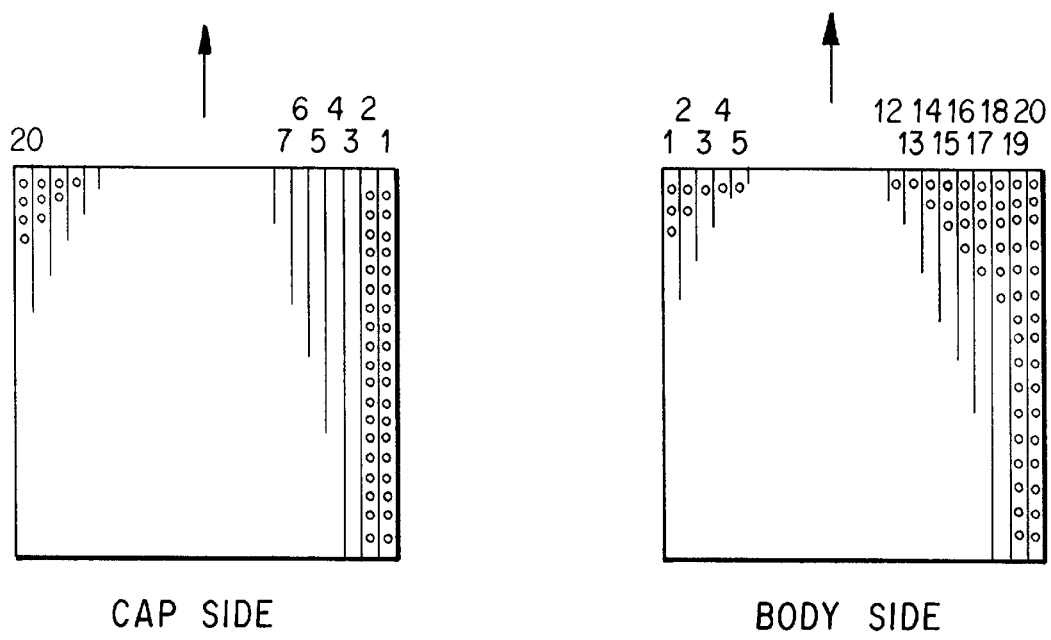
FIG. 10C shows a group of cap pinbars and the corresponding group of body pinbars.

FIGS. 10A and 10B show temperature sensors and under-deck heaters for preheat on the split deck in the drying kiln. FIGS. 10A and 11 give details of split deck 810 and radiant panel 809 respectively from FIG. 8C. FIG. 10A shows sensors 104 mounted in deck 101. Heaters 103 are mounted under the deck. Both sensors and heaters are electrically connected to controllers 105 which maintain the predetermined temperatures given in Tables 6A and 6B. The deck itself contains thermal isolators 102, so that the several sections of deck beneath a given pinbar are thermally isolated one from another. Cap pinbars move in groups of twenty from station to station approximately every 40–70 seconds in the drying kilns and body pinbars do likewise. The direction of movement of the pinbars is shown by the arrows in FIG. 10C. Such a group of pinbars has a length of 22 inches (56 cm), the length of one pinbar, and a width of 17 inches (43 cm), the width of twenty pinbars. Supporting the pinbars in the last station of the drying kiln is the split deck shown in plan view in FIG. 10D. The thermal isolators 102 and the portions of the deck 101 enclosed by the thermal isolators are also shown in cross-section elevation view in FIG. 10A. Selective heating of different portions of twenty pinbars to compensate for pre-dip dwell time and for temperature gradient in the machine is achieved by controllers 105 controlling each of the several enclosed deck portions at a predetermined temperature. A temperature profile for a preferred embodiment of the present invention is given for each enclosed deck portion 101 of FIG. 10D in Table 6A for the cap side and Table 6B for the body side. The dimensions of the enclosed deck portions 101 in FIG. 10D are given in Table 7.

TABLE 6A

CAP SIDE SPLIT DECK TEMPERATURE PROFILE

|   | A<br>° F. (° C.) | B<br>° F. (° C.) | C<br>° F. (° C.) | D<br>° F. (° C.) |
|---|---|---|---|---|
| 1 | 306 (152) | 251 (122) | 235 (113) | 267 (131) |
| 2 | 181 (82.8) | 178 (81.1) | 153 (67.2) | 174 (78.9) |
| 3 | 193 (89.4) | 165 (73.9) | 135 (57.2) | 142 (61.1) |

TABLE 6B

BODY SIDE SPLIT DECK TEMPERATURE PROFILE

|   | A<br>° F. (° C.) | B<br>° F. (° C.) | C<br>° F. (° C.) | D<br>° F. (° C.) |
|---|---|---|---|---|
| 1 | 246 (119) | 191 (88.3) | 252 (122) | 288 (142) |
| 2 | 213 (101) | 125 (51.7) | 193 (89.4) | 154 (51.1) |
| 3 | 209 (98.3) | 195 (90.6) | 273 (134) | 261 (127) |

TABLE 7

CAP AND BODY SIDE, DECK SECTION DIMENSIONS

|   | A<br>Inch (mm) | B<br>Inch (mm) | C<br>Inch (mm) | D<br>Inch (mm) |
|---|---|---|---|---|
| 1 | 3 × 4<br>(76 × 102) | 5 × 4<br>(127 × 102) | 5 × 4<br>(127 × 102) | 3 × 4<br>(76 × 102) |
| 2 | 3 × 10<br>(76 × 254) | 5 × 10<br>(127 × 254) | 5 × 10<br>(127 × 254) | 3 × 10<br>(76 × 254) |
| 3 | 3 × 4<br>(76 × 102) | 5 × 4<br>(127 × 102) | 5 × 4<br>(127 × 102) | 3 × 4<br>(76 × 102) |

FIG. 11 shows non-contact temperature sensors and overhead radiant heaters for general preheat on the split-deck in the drying kiln, detail 809 of FIG. 8C. Non-contact sensors 111 measure the temperature of the pins (or local area of pinbar) from above. Overhead radiant heaters 112 are mounted to the thermal enclosure 113. Controllers 106 are used (in conjunction with controllers 105) to maintain the predetermined temperatures of Tables 6A and 6B on the split deck.

Additionally, hot air may be used for heating in the split deck area.

FIG. 8G shows the insulation box 831 for preserving preheat in the table section 27. The box has a top and only two sides, one side being omitted to allow a group of twenty bars to enter and another side being omitted to allow bars to exit (in a direction transverse to their length) one at a time.

Figure 8D:
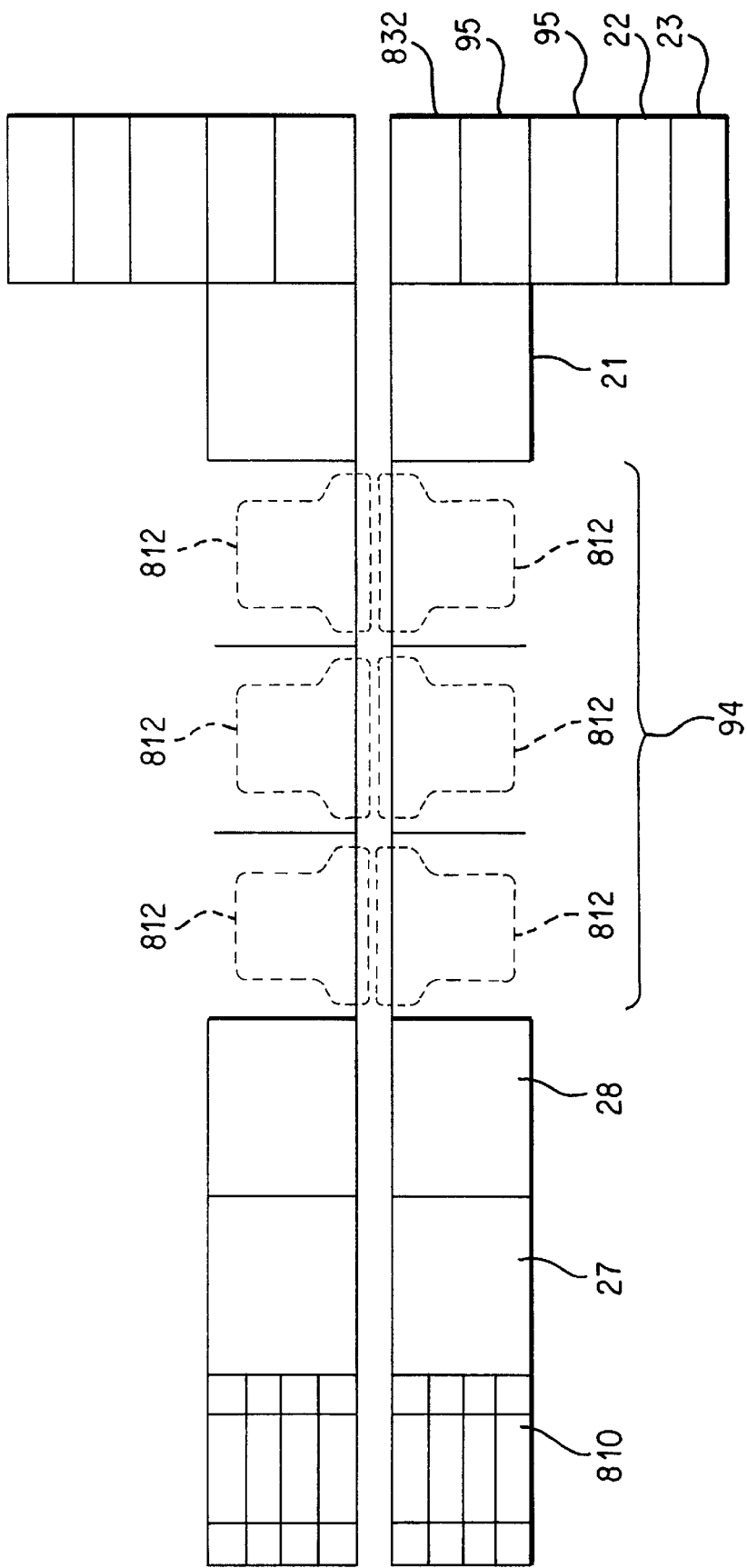
FIG. 8D shows a schematic plan view of all sections between the split deck and the spinners.

FIG. 8C locates (schematically) the table section 27, the automatics 28, the convection preheat section 94, the greaser section 21, the dipper section 22 and the spinners 23. The convection preheat section 94 includes up to three convection heat systems 812 on each side. Arrows 813 indicate the direction of flow of heated air across the pinbar after the pinbar has left the automatics where capsules were removed and before the pinbar enters the greaser section 21 and the dipper 22. The location of each of the six convection preheat systems 812 is shown in FIG. 8D between automatics 28 and greaser section 21. The convection preheat system is shown in greater detail in FIGS. 8E and 8F. FIG. 8E shows the squirrel cage blower 821, the heating element 822, the supply duct 823, the pinbar 824, the pin 825 and the return duct 826. To accommodate the convection preheat section 94, the original Colton machine was extended by three table-lengths, i.e., the upper kiln was extended three table-lengths and the greaser section was moved three table-lengths away from the automatics. In a preferred embodiment, four convection preheat systems are used, two on each side. FIG. 8D also shows a schematic plan view of all sections between the split deck 810 and the spinners 23, including the accumulators 832 and the final preheat section 95, whose location necessitates that the dishes are located farther apart than they are in the traditional Colton machine.

Lubrication used in the greaser section 21 consists of a mixture of light mineral oil (59 percent), stearic acid (16 percent), calcium stearate (16 percent), and lecithin (9 percent). A very small measured quantity is delivered by a metering pump to a felt or brush which applies the lubricant directly to the pins. Then a felt-lined barrel distributes the lubricant uniformly over the pin surface.

Figure 12:
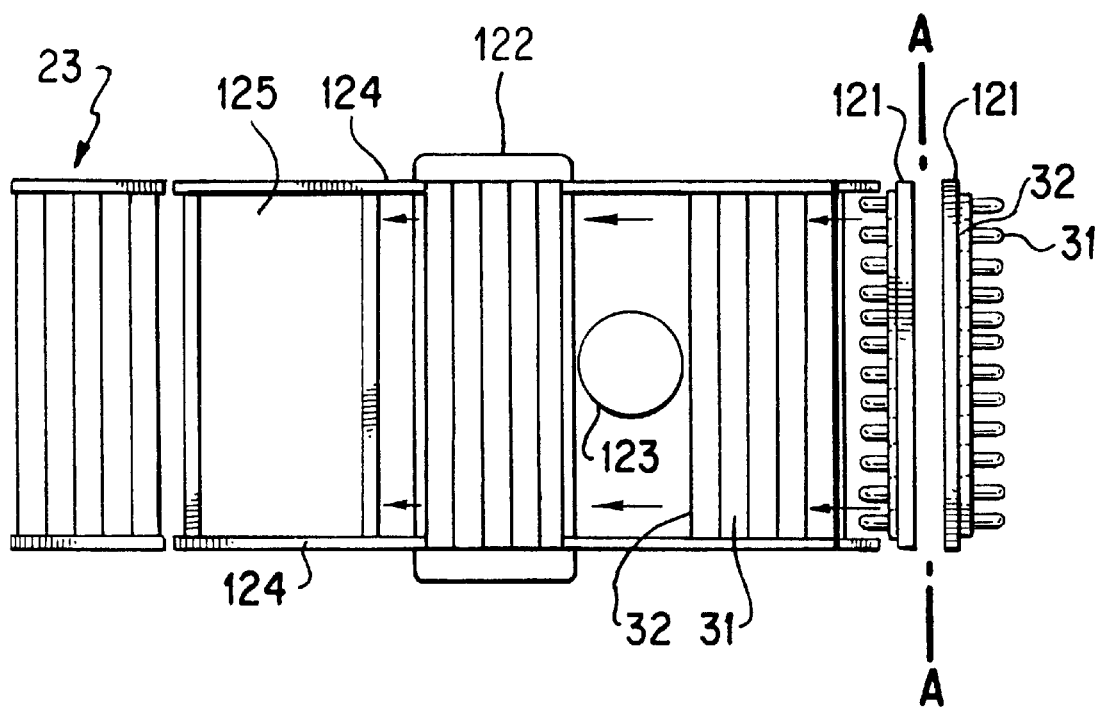
FIGS. 12 and 13 show a plan and elevation view respectively of a dipper section preheat arrangement.
Figure 13:
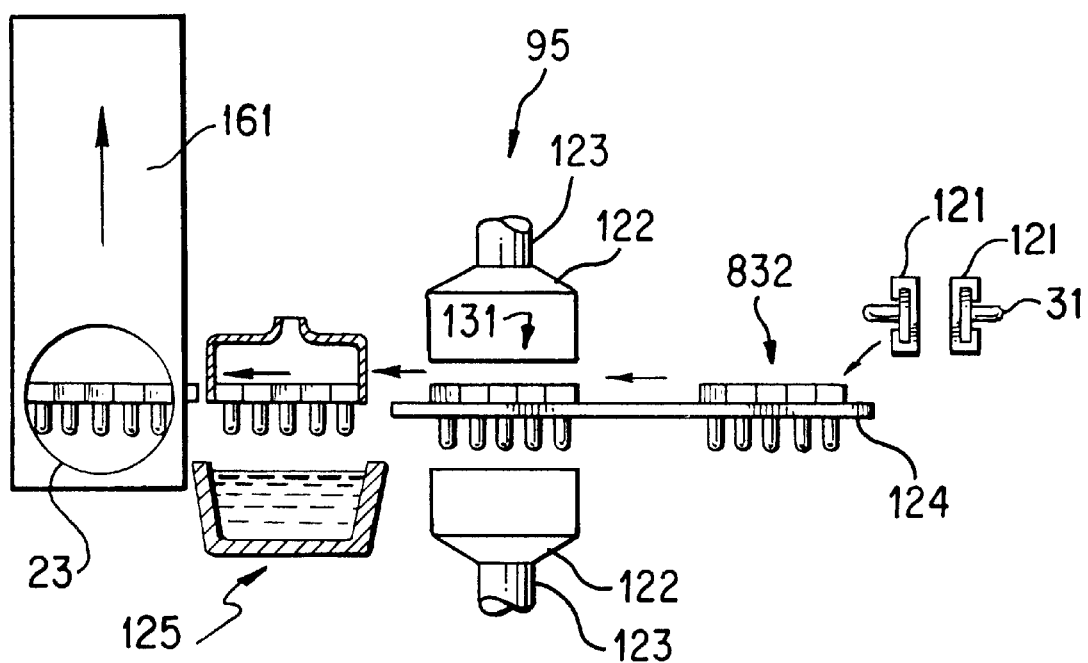

FIGS. 12 and 13 show a plan and elevation view respectively of a dipper section preheat arrangement. There is symmetry about line A—A except that capsule bodies are on one side and capsule caps are on the other. Body pinbars and cap pinbars slide into the dipper section preheat area in T-slides 121 and drop onto guide rails 124. The dipper dishes are spaced apart to allow an area for the final preheat section 95. See also FIG. 9. Heated air is blown across the pinbars via inlet ducts 123 and preheat hoods 122. The pinbars, leaving the preheat area, are dipped in groups of five in the dipping dish 125 and spun in the spinners 23 within an enclosure 161.

FIG. 13 shows a group of five bars in the accumulator 832 (five bars having fallen from the T-slides one at a time until five bars are accumulated in the accumulator). This group of five bars moves to station 131 in the final preheat section 95 where final preheat is applied. In an alternative embodiment, one that eliminates the need for preheating pins according to a time interval to compensate for different delay times between preheat and dipping, the dishes are moved apart further to accommodate a sufficient number of stations 131. In this embodiment all preheat is performed between the accumulator and the dishes and is performed without disturbing the layer of grease that was applied to the pins on the greaser. Heat is preferably applied by thermal convection from hot air flowing over the pins as shown in FIG. 13, or by radiant heat. Heat may also be applied by moving a conducting bar into contact with the top surface of the bars, the pins pointing down as shown in FIG. 13. Alternatively, induction heating may be used.

Figure 14A:
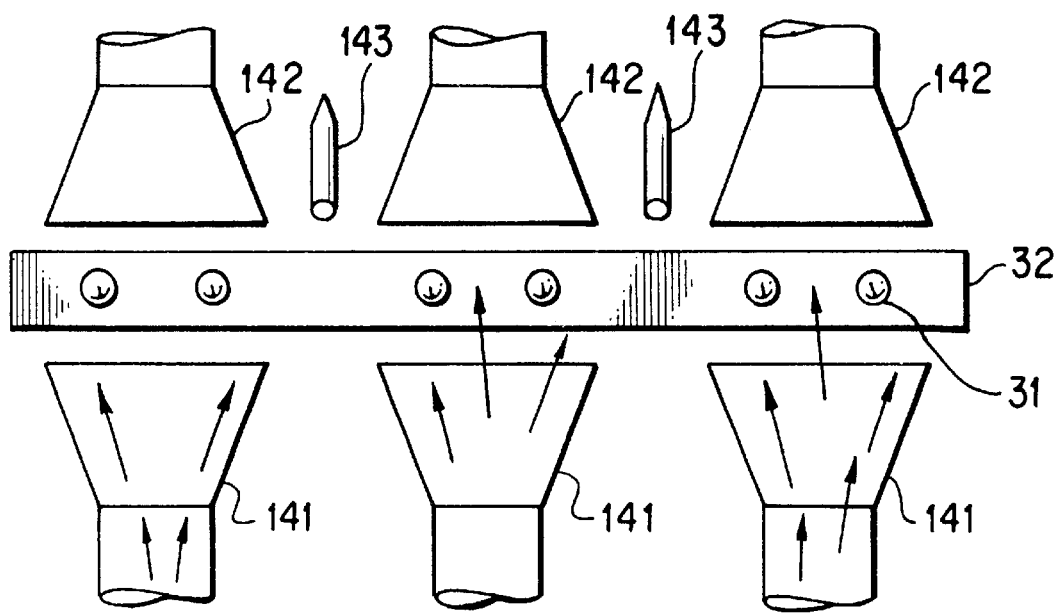
FIGS. 14A and 14B show two views of a preheater with air ducts for selectively heating pins.
Figure 14B:
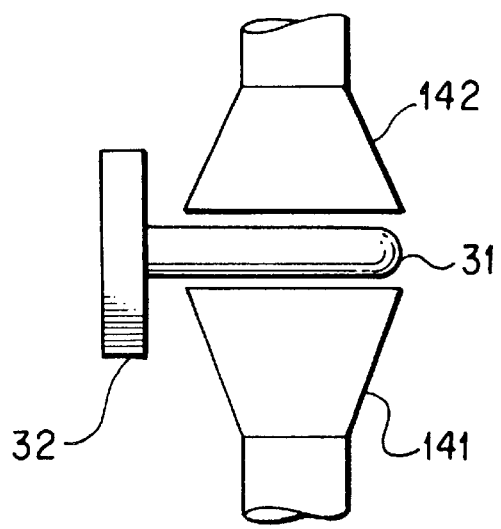

FIGS. 14A and 14B show two views of a preheater with air ducts for selectively heating pins in the T-Slides. Air for heating the pins passes through supply ducts 141 and return ducts 142. The local temperature of the pinbar is measured by non-contact sensor 143. This is an alternative to the convection preheat section of FIGS. 8E and 8F.

Figure 15:
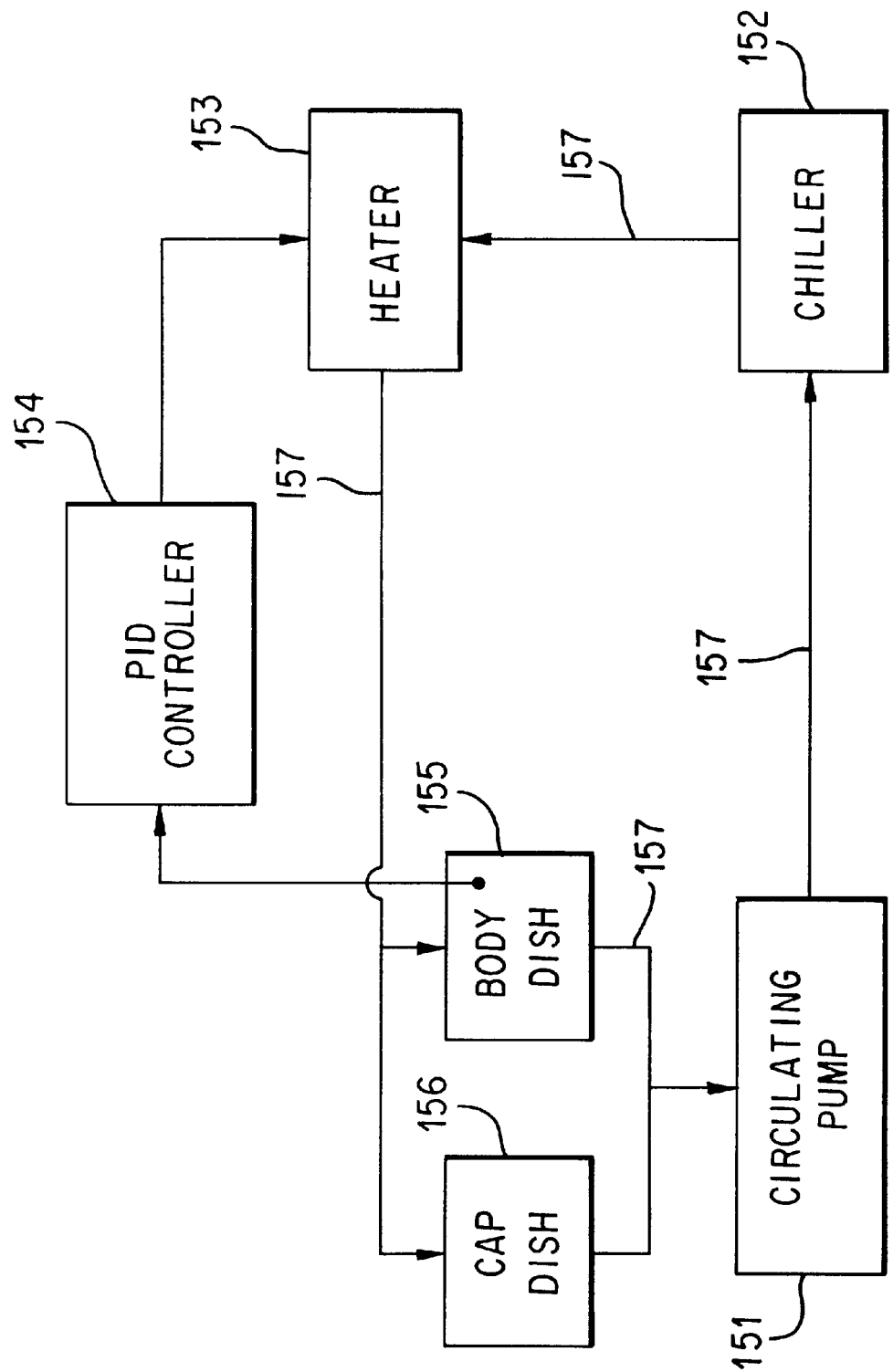
FIG. 15 shows the gel dish temperature control scheme.

FIG. 15 shows the schematic for control of the dish temperatures. Water 157 is pumped by circulating pump 151 through a chiller 152 and a heater 153. The heater is controlled by a PID controller 154 connected to a temperature sensor in the body dish 155. After the water leaves the heater, it flows through jackets around both the body dish 155 and the cap dish 156. The temperature in both dishes is controlled to 81° F.±1° F. (27.2° C.±0.6° C.). Body pins should enter the dish at a temperature of 152° F. (66.7° C.) (range 144° F.–156° F. (62.2° C.–68.9° C.)) and cap pins at a temperature of 151° F. (66.1° C.) (range 149° F.–156° F. (65.0° C.–68.9° C.)). After a pin has been dipped, its temperature should be in the range shown in Table 8.

TABLE 8

PIN TEMPERATURES AFTER DIPPING

| Temperature Location | | Optimum ° F. (° C.) | Minimum ° F. (° C.) | Maximum ° F. (° C.) |
| --- | --- | --- | --- | --- |
| Table Load (Spinner) | Body | 124 (51.1) | 123 (50.6) | 126 (52.2) |
| | Cap | 122 (50.0) | 121 (49.4) | 124 (51.1) |
| Table 1 of Upper Deck | Body | — | 119 (48.3) | 121 (49.4) |
| | Cap | — | 120 (48.9) | 124 (51.1) |

FIGS. 16A, 16B and 16C show apparatus for heating the pins through the pinbar to permit post-dip gelation in the spinner section and "inside-out drying" in the drying kiln. The spinner section is enclosed and heat is applied to the pins to cause continued gelation and inside-out drying. Heat is applied in the spinner section by blowing hot air over the pins via ducts 163 and 164 and by heating the pins from radiant panels 162 mounted to the walls of the enclosure 161. Panels 162 are substantially parallel to the longitudinal axes of the bars. It has been found that using a pin temperature at dipping that is cooler than the temperature used by Murphy, and heating the pins after dipping to continue gelation, provides a better consistency and fewer defects in the finished capsule. Heat applied to the pinbar in the drying section drives moisture from the inside-out as shown in FIGS. 16B and 16C (inside-out drying). Arrows in FIG. 16C in the bar and pin indicate flow of heat. Arrows in FIG. 16C in the gel and in the air indicate flow of moisture. Inside-out drying prevents the formation of "skin" on the outer surface of the capsule that can occur when drying from the outside with blown air alone.

FIG. 17 illustrates the process of removing the capsule part from the pin. A gripper 171 (modified stripper) pivots about pivot 172, when driven by wedge 173, to grip the capsule part 174 prior to sliding it off the pin. The gripper has opposed gripping faces.

Figure 6:
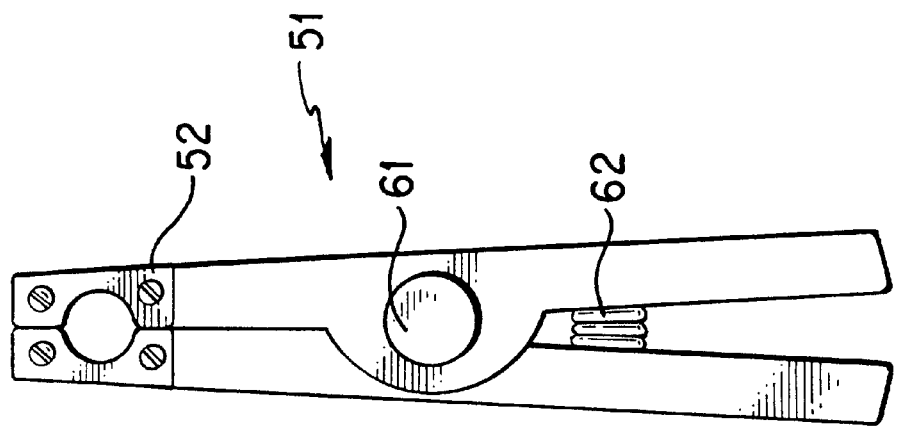
FIG. 6. shows a prior art stripper.
Figure 5:
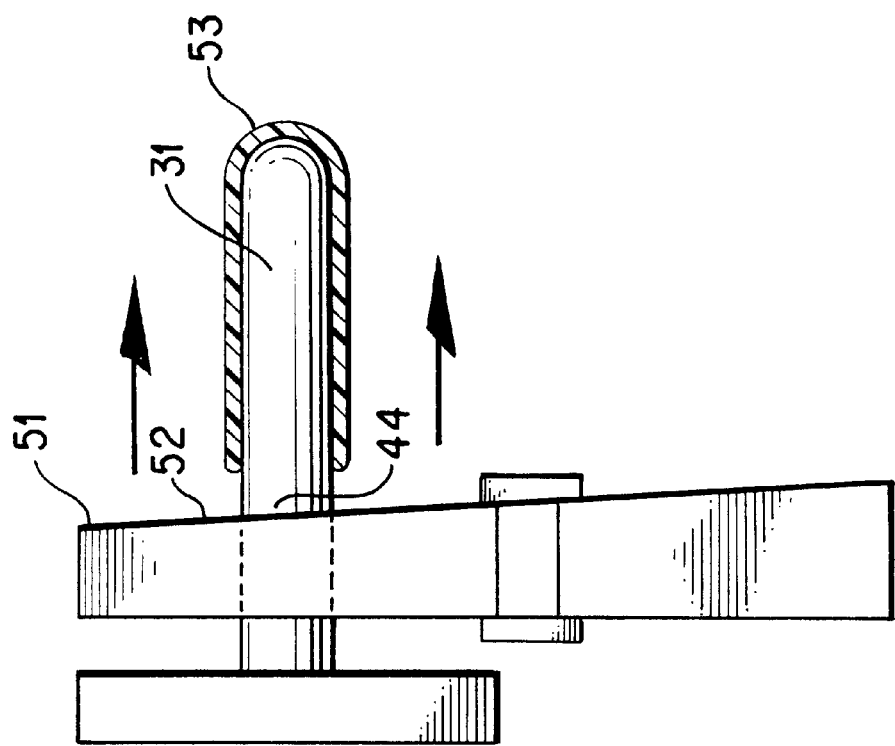
FIG. 5 shows a prior art stripper pushing a capsule part off a pin.
Figure 18:
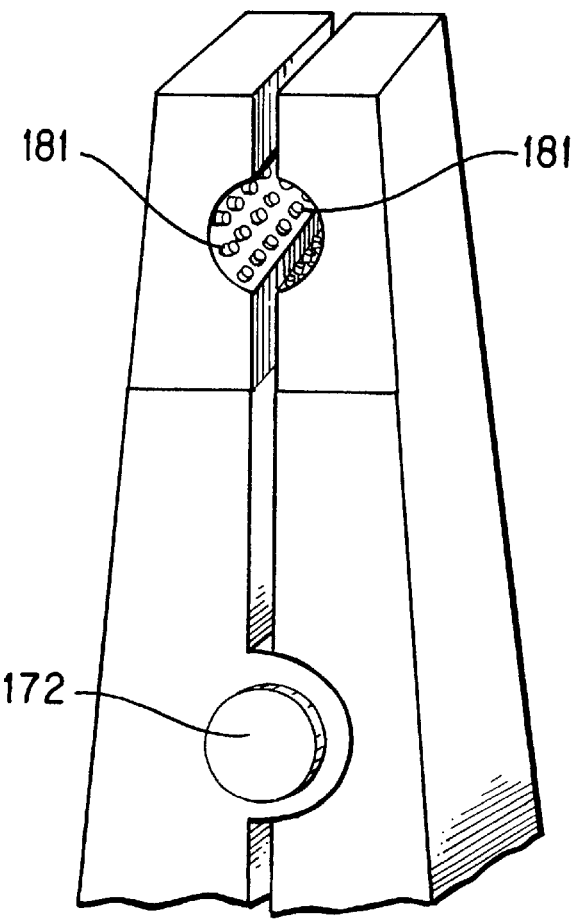
FIG. 18 gives detail of the stripper of FIG. 6 as modified for the present invention.

FIG. 18 gives details of the gripper of FIG. 6. The gripping faces 181 may be provided with raised ridges or rows of teeth (which may be longitudinal or circumferential to the axis of the pin), or have surface composition or texture, so as to grip the capsule.

6. Pin Size

An important factor in achieving production quantities of capsule bodies and caps that will run problem-free in high-speed filling machines is to meet close specifications, especially on external dimensions. For examples if the external diameter of each capsule part is even slightly too large, caps and bodies will not consistently separate in the filling chamber because they are too tight a fit. The external diameter of a capsule part is determined by the diameter of the pin mold, the shrinkage of the capsule material after removal from the mold, and the thickness of the capsule wall. The thickness of the capsule wall depends on a number of factors including the initial moisture content and viscosity of the gel and the drying conditions. Accordingly, it is recommended, for the manufacture of a cellulose capsule part, to use a pin whose diameter is undersized compared to the capsule pin for the corresponding size gelatin capsule part. For example, for the manufacture of a "0" size cellulose capsule part it is recommended to use a capsule pin whose diameter is undersized by an amount in the range of approximately 0.002–0.006 inch (0.05–0.15 mm) or approximately 0.004 inch (0.1 mm) compared to the capsule pin for manufacture of a "0" size gelatin capsule part. For other capsule sizes, it is recommended that the pin diameter be undersized proportionately. From Table 4; the cut-point diameter of the prior art capsule cap pin is 0.2975 inch (7.56 mm) so a reduction range of 0.002–0.006 inch (0.05–0.15 mm) represents a reduction range of 0.7%–2.0% and a reduction of 0.004 inch (0.1 mm) represents a reduction of 0.13%. For forming capsule parts for capsules having thicker walls and the same external diameter, the pin diameter may be reduced further as discussed under "Increasing Capsule Stiffness" hereinbelow.

7. Cooling the Dipping Dishes

Passive cooling was found to be insufficient to dissipate the heat delivered to the dipping dishes by the entry of a succession of hot pins. In the prior art machines used to make gelatin capsules this problem cannot arise because cold pins are dipped into a hot gel. In these prior art machines, a jacket having pipes is used to pass hot water to maintain the temperature of the dipping dishes. A similar jacket is used in the present invention except that in the present invention the jacket is used for cooling. The jacket includes pipes that carry cooling water for removing heat from the dipping dishes so as to control the temperature of the solution in the dipping dishes and the maintain the solution at a substantially constant predetermined temperature.

8. Increasing Capsule Stiffness

Cellulose capsules made from the improved methyl cellulose ether composition disclosed by Sarkar are found to be less rigid than gelatin or earlier cellulose capsules of an equivalent shape, size and wall thickness. Also, it is essential that the capsule parts retain their shape in order to pass freely through the high-speed filling machine. For these reasons it has been found beneficial to increase the wall thickness of the capsule parts without increasing the external diameter of the capsule. (The external diameter of the capsule is the external diameter of the capsule cap.) Increasing the wall thickness for a given capsule size is accomplished by using a thinner cap pin, a thinner body pin and a combination of hotter pin and/or thicker solution. Other factors which may be used to increase wall thickness are longer dwell time in the dipping dishes, more time in the downward position in the spinning section and a modified temperature profile in the gelling stage. For a "0" size capsule, a wall thickness increase of approximately 0.0005 inch (0.013 mm) is recommended, yielding a wall thickness of a capsule cap of approximately (0.0042+0.0005)=0.0047 inch (0.119 mm). To increase the wall thickness of a capsule cap by an additional dimension Δw without increasing the external diameter, it is necessary to reduce the diameter of the cap pin by approximately 2×Δw. To make the corresponding capsule body it is necessary to reduce the diameter of the body pin by approximately 4×Δw so that the body will fit into the smaller inside diameter of the cap. Accordingly, for a "0" size cellulose capsule having a wall thickness as recommended, the cap pin diameter is reduced by 0.001 inch (0.026 mm) and the body pin diameter is reduced by 0.002 inch (0.052 mm) in addition to the reduction discussed hereinbelow under "Capsule External Diameter and Pin Mold Diameter." From Table 4, the cut-point diameter of the prior art cap pin is 0.2975 inch (7.56 mm), so an additional reduction 0.001 inch (0.026 mm) represents an additional reduction of 0.3%. Again from Table 4, the cut-point diameter of the prior art body pin is 0.2855 inch (7.25 mm), so an additional reduction of 0.002 inch (0.052 mm) represents an additional reduction of 0.7%.

Alternatively, or additionally, the stiffness of the capsule may be increased by providing in the capsule body a reinforcing ring, similar to the locking ring, located between the locking ring and the dome of the capsule body. This approach provides, for a given capsule wall thickness, a stiffer capsule with a reduced penalty in terms of material content of the capsule body and reduction in interior volume of the finished capsule. One or more reinforcing rings may be provided.

9. Serial Dipping

An alternative embodiment of the present invention uses serial dipping of pins instead of the batch dipping using a modified Colton machine as described hereinabove. Serial dipping permits every pin to proceed through an identical preheat process. This eliminates the need to compensate for different elapsed time pin-to-pin between preheat and dipping. Dipping one pin at a time would, of course reduce the throughput rate by a factor of 150 over the embodiment of FIG. 8A in which there are thirty pins per bar and five bars are dipped together as a batch. However, it would be possible to mount pins on an articulated base (i.e., a chain) one pin per link, and circulate several such chains in parallel through a preheat process, a dipping process and a drying process on a machine, including an enclosed drying kiln, designed for the purpose. Another alternative embodiment of the present invention provides multiple pins on a bar and transports one bar at a time through both the preheat section and the dipping section. In this way the bar-to-bar difference of elapsed time is eliminated and only the differential temperature along the bar must be compensated. This could be accomplished by a functional equivalent of the split deck.

Solutions to the Problems Unresolved in the Prior Art

A. Analysis of the Problems in the Prior Art

An important contribution of the present invention is the analysis of the several unresolved problems in the prior art from the perspective of each stage of manufacture and use, as follows:

A1. Preheat

In the Colton machine the most acceptable areas for preheating are those prior to the table section where the bars are assembled in groups of twenty and are stationary for a period during which they can all be heated together. However, the problem with preheating prior to the table section is that the action of the table section causes some bars to wait longer than others for their turn to dip and this can result in some bars cooling more than others prior to dipping, with the cooler bars making thinner capsule walls than the other bars. Also, the pins on one end of the bar might be hotter or cooler than the pins on the other end of the bar simply due to temperature gradients across the machine.

An appropriate place to heat the bars is in the dipper section just prior to dipping. In that section of a traditional Colton dipping capsule machine, five or more bars are grouped together and then moved as a group over to the dish for dipping in the gel solution. This allows for simultaneous heating of a group of bars which avoids the waiting problem identified above. The only patent to address preheating bars in the dipper portion of the Colton machine is Chisholm. In the Chisholm patent, pins are dipped into heated particles which contact the pins directly, heating them to the appropriate temperature for dipping. This approach creates other problems. First, the lubricant coating on the pin prior to dipping is important because cellulose capsules are much more difficult to remove from the pins than gelatin. Since the lubricant is already applied at this point in a Colton style capsule machine, the use of a pin-contact heating method results in unreliable capsule removal due to disturbance of the lubricant layer. Second, there is the problem of lubricant continuing to accumulate in the bead particles, degrading in the heated particles, and being redeposited on the pins at a later time. Third, there is no room in a traditional Colton machine to accommodate such a heated particle device. Fourth, no method of preheating alone (as opposed to pre-and post-heating) has been successful in making capsules from the Sarkar improved cellulose of sufficient uniformity for high-speed filling.

A2. Capsule External Diameter and Pin Mold Diameter

For any given standard size of capsule (such as "0", "1", "2", etc.), the size of the pin mold used in the prior art is a well accepted standard with little variation in size. The combination of the standard pin mold diameter, accepted standards of wall thickness, and shrinkage contribute to an overall dimensional standard for the outside diameter of a capsule of a given size which can be accommodated without difficulty on high-speed filling machines where tolerances are tight.

The prior art teaches that the same pin mold may be used for cellulose as is used for gelatin, and there is no prior art that has stated otherwise However, using the prior art pin for a given capsule size makes a cellulose capsule that is often oversized compared the given standard size capsule. This causes difficulties in the high-speed filling machines.

A3. Drying

The traditional drying kilns in the prior art employ plates with holes above the pins to introduce a stream of air in proximity to the capsules (Wilkie). Blowing air over the pins causes evaporative cooling which works well with gelatin since the cooling helps set the gel. However, with cellulose the object is to keep the gel above its thermal gel point until it is thermally set to a sufficient firmness. The traditional (Wilkie) design cools the wet cellulose gel through evaporative cooling, and can cause the gel to flow unevenly and uncontrolled down the mold pin. This makes an uneven capsule which cannot be filled on the precise high-speed filling machines.

Further, while some air movement is necessary to remove water vapor released during drying, air movement has a tendency to deform capsules made of cellulose more drastically than capsules made of gelatin, and a directed stream of air over the capsules can shift the gel before it is firm.

Blowing air over the exterior of the pins also causes the gel to dry from the outside first, causing a "skin" to form which traps moisture inside the film. This can lead to wrinkles or corrugations of the capsule wall, and subsequent problems on high-speed filling machines. Murphy employed a drying design similar to the Wilkie plates, but his patent concerns methyl cellulose which is slower drying and less apt to surface harden. The modified cellulose indicated in the Sarkar patent has a tendency to dry faster and is prone to deformation when dried in the conventional way.

Experimental work done by Eli Lilly with the improved Sarkar cellulose showed that conventional drying design with plates and holes has a tendency to cause starred ends and corrugations of the capsule walls. This is a result of compromise in the cellulose formulation, which improves dissolution (in the human digestive system) but results in faster release of moisture compared to celluloses used in earlier capsule technology.

Higher temperatures are used in the cellulose drying process than are used in the gelatin drying process. In the prior art drying process, air blows over the pins and escapes to the room. With the higher temperatures of the cellulose drying process, this adds significant heat and heating loads to the room and requires costly air conditioning.

A4. Capsule Removal

With the improved cellulose in the Sarkar patent, removal of the capsule from the pin mold is one of the most difficult problems. The traditional approach used before the present invention involved a clothespin like device, called a stripper. The stripper traveled over the dipped length to a position beyond the capsule part. It then closed on the bare pin and moved along the length of the pin until it contacted the edge of the capsule and subsequently pushed the capsule part off the pin.

The improved cellulose lacks the rigidity necessary for a clean release from the pin when contacted by the stripper cheek. There is a tendency for the cellulose part to continue to adhere to the pin and to deform and break under stripper pressure rather than releasing freely.

A further complication in stripping cellulose capsules is the low moisture content. Whereas moisture can aid capsule removal in the gelatin process, cellulose capsules become soft at even modest moisture levels. Thus stripping must always be accomplished under dry capsule conditions. As with gelatin, dry capsules make capsule removal more difficult.

Increasing lubrication to aid stripping also poses problems since the cellulose gel is very prone to movement during and immediately after the dip. Excessive lubrication, or even lubricants with particularly slippery characteristics, have a tendency to cause uneven capsule walls. High temperatures inherent in the process add other constraints to the choice of lubricant.

A5. Capsule Filling

Lack of uniformity, the sources of which are discussed hereinabove, causes problems on high-speed filling machines. In addition, the flexibility of the improved Sarkar cellulose also causes another problem: being flexible, the capsules are easily deformed out of round.

B. Solution of the Problems in the Prior Art

The problems in each stage of making and using the capsules are solved in the following manner:

B1. Preheat

Since some bars must wait longer than others to dip, the present invention addresses the issue of differential cooling and temperature compensation by selectively heating some bars to a higher temperature than other bars so that all bars have substantially the same temperature when dipped as a group of five or more. This is accomplished by using a pattern of thermally isolated heating elements below the bars (the "split deck") and above the bars (radiant heaters). These heating elements selectively heat certain bars to predetermined temperatures so that substantially equal temperatures are achieved at dip.

In addition, the temperature of a bar may vary along its length or front to back. The split deck allows the selective heating of portions of bars, those portions which are otherwise repeatedly cooler than other portions. Thermal sensors are used to maintain the individual heating areas at an appropriate temperature to consistently deliver all bars and portions of bars at substantially the same dip temperature.

Preheating in the dipper section may be accomplished by heating the pins by a non-contact heating method which overcomes the problems associated with Chisholm's heated particle method. Hot air, radiant elements, etc. may be used in proximity to the pins without disturbing the lubricant layers and without the concern of deposits of lubricant on the contact particles. To accommodate non-contact preheating in the dipper just prior to dip, the present invention modifies the Colton style machine by extending it away from centerline on both the cap side and the body side. Also, contact to the back of the bars (away from the pins) may be used to aid preheating in the dipper. Heated elements may be moved directly in contact with the back of the bars as sole preheating, or in conjunction with a non-contact heating method applied to the pin side of the bar.

To achieve the level of uniformity necessary for high speed filling, pre-dip heating and post-dip heating are used in conjunction. Post-dip heating continues the gelling process after the dip and assures rapid firming of the cellulose film. This is accomplished by applying heat directly before the dip and directly after the dip and continuing to apply heat for gelation and inside-out drying until the film is sufficiently firm.

B2. Capsule External Diameter and Pin Mold Diameter

The apparatus of the present invention includes a pin mold which is undersized to compensate for the differential in shrinkage between capsules made from the improved cellulose composition and capsules made from gelatin. This results in a cellulose capsule which has the same overall diameter and wall thickness as the equivalent gelatin capsule, and is therefore capable of running in existing high-speed filling machines.

B3. Drying

The present invention does not use plates with air blowing directly over the pins, but uses a fully enclosed drying tunnel (kiln), in which drying is accomplished by inside-out drying in the most critical stages of drying. This is accomplished by using heating elements directly under the deck (or bottom) of the drying tunnel and radiant elements overhead in the drying tunnel, keeping pins above the thermal gel point of the cellulose in the early drying stages. This drives moisture out from the inside. It avoids the skinning over and wrinkling associated with the outside-in drying of the prior art.

Process air is directed through the enclosed drying tunnel in counterflow to the direction of motion of the pins. The purpose of the counterflow air is not so much to dry the capsule walls, but rather to move moisture through the system which has been driven out of the capsule parts by inside-out drying so the moisture can be exhausted from the drying kilns. In this procedure, drier capsules at the end of the drying tunnel come into contact with dry air which is introduced at the end of the drying tunnel. As the air moves towards the beginning of the drying tunnel, it picks up moisture. Therefore, wet capsules at beginning of the drying tunnel come into contact with wet air and drier capsules at the end of the drying process come in contact with drier air. This keeps an appropriate relationship of water vapor pressure between capsules and throughput air throughout the drying process to ensure even drying. The result is a capsule part without deformation.

In addition, local heating or air agitation is employed to speed drying in selected areas where the film is sufficiently firm so that deformation is not a problem. Full enclosure and insulation of the drying kilns also prevents heat escaping into the room, thereby avoiding the higher heating load on the facility that would occur without full enclosure. This is in direct contrast to the prior art, in which not air is blown over the capsule parts and then escapes into the room.

B4. Capsule Removal

Murphy used the non-modified cellulose, which was rigid enough to be removed by traditional methods. However, the improved dissolving cellulose of Sarkar cannot be consistently removed by pushing capsule parts off the pin by pushing from behind the dipped edge. In the present invention, the "stripper" device is modified into a gripper, which has two opposed surfaces which grab the capsule above the dipped edge, on the capsule wall itself, and remove the capsule using pressure to the side walls in conjunction with a motion along the longitudinal axis of the pin mold. The Colton machine is modified to allow the grippers to open wider than normal strippers and the machine is also modified to move the gripper into a position closer to the closed end of the capsule so that it contacts on the capsule surface, rather than behind it. This action removes the capsule without damage to the open end, which often occurs when the prior art technique is used on cellulose capsule parts.

B5. Capsule Filling

The flexibility of capsules made from the improved cellulose can cause capsules to malfunction in filling machines, particularly if deformed out of round. The apparatus of the present invention provides a pin which is undersized (in the correct amount) to allow a thicker capsule wall, and therefore better rigidity, while maintaining the accepted overall diameter of a given standard capsule size, such as "0", "1", etc.

The apparatus of the present invention also provides a body pin which adds an extra circumferential ring to the capsule body between the lock ring and the dome which physically reinforces the capsule wall. One or more extra rings may be added to increase the overall strength of the capsule body part, and to assure capsule bodies remain circular.

What is claimed is:

1. A method of manufacturing pharmaceutical cellulose capsules suitable for filling by capsule filling machines, each capsule consisting of two parts, a capsule body and a capsule cap, from an aqueous solution of a thermogelling cellulose ether composition, using a capsule machine having capsule body pins and capsule cap pins as molds, comprising the steps of:

gelatinizing solution on the pins, including dipping each pin in the solution to a dip line, to form on each pin a capsule part of thermally gelatinized solution;

drying the gelatinized solution on the pins to form capsule bodies and capsule caps; and removing the capsule bodies and capsule caps from the pins;

wherein drying the gelatinized solution includes moving the pins through an enclosure and moving air over the pins within the enclosure, the air moving in a direction opposed to the direction of movement of the pins;

such that, during an early stage of drying, the gelatinized solution on the pins encounters humid air; and during a later stage of drying encounters drier air.

2. A method according to claim 1, wherein moving air in a direction opposed to the direction of movement of the pins includes moving air over capsule body pins at one rate and moving air over capsule cap pins at a different rate.

3. A method according to claim 1, further comprising the step of controlling the humidity of air entering the enclosure.

4. A method according to claim 3, further comprising the step of controlling the humidity of air entering the enclosure within a range 0.006–0.012 lb water/lb air (0.6–1.2 percent).

5. A method according to claim 1, further comprising the step of controlling the temperature of air entering the enclosure within a range 125° F.–180° F. (52° C.–82° C.).

6. A method according to claim 1, further comprising the step of heating the pins within the enclosure to achieve a predetermined air temperature profile within the enclosure.

7. A method according to claim 1, further comprising the step of controlling the flow of air within the enclosure to achieve a predetermined humidity profile within the enclosure.

8. A method according to claim 1, wherein drying the gelatinized solution on the pins includes heating a pin via a bar in an early stage of drying such that heat applied via the bar and the pin at an inner surface of a capsule part in combination with humid air surrounding the capsule part causes the capsule part to dry slowly from the inside-out.

9. A method according to claim 1, wherein drying the gelatinized solution on the pins includes heating a pin by radiant heat in an early stage of drying such that the radiant heat at an inner surface of a capsule part in combination with humid air surrounding the capsule part causes the capsule part to dry slowly from the inside-out.

10. A method according to claim 4, further including the step of controlling the temperature of air entering the enclosure within a range 125° F.–180° F. (52° C.–82° C.).

11. A method of manufacturing pharmaceutical cellulose capsules suitable for filling by capsule filling machines, each capsule consisting of two parts, a capsule body and a capsule cap, from an aqueous solution of a thermogelling cellulose ether composition, using a capsule machine having capsule body pins and capsule cap pins as molds, comprising the steps of:

gelatinizing solution on the pins, including dipping each pin in the solution to a dip line, to form on each pin a capsule part of thermally gelatinized solution;

drying the gelatinized solution on the pins to form capsule bodies and capsule caps; and removing the capsule bodies and capsule caps from the pins;

wherein drying the gelatinized solution includes moving air over a capsule part such that, during an early stage of drying the capsule part encounters humid air, and during a later stage of drying encounters drier air.

12. A method according to claim 11, further comprising the step of controlling the humidity of the drier air encountered by the capsule part during the later stage of drying.

13. A method according to claim 12, further comprising the step of controlling the humidity of the drier air encountered in the later stage of drying within a range 0.006–0.012 lb water/lb air (0.6–1.2 percent).

14. A method according to claim 13, further comprising the step of controlling the temperature of the drier air within a range 125° F.–180° F. (52° C.–82° C.).

15. A method according to claim 14, wherein the temperature of the drier air is approximately 149° F. (65.0° C.).

16. A method according to claim 14, wherein the temperature of the humid air is approximately 111° F. (43.9° C.).

17. A method according to claim 14, wherein the temperature of the drier air is approximately 149° F. (65.0° C.), and the temperature of the humid air is approximately 111° F. (43.9° C.).

18. A method according to claim 13, wherein moving air over the capsule part includes moving air over a capsule body pin at one rate and moving air over a capsule cap pin at a different rate.

19. A method of manufacturing pharmaceutical cellulose capsules suitable for filling by capsule filling machines, each capsule consisting of two parts, a capsule body and a capsule cap, from an aqueous solution of a thermogelling cellulose ether composition, using a capsule machine having capsule body pins and capsule cap pins as molds, comprising the steps of:

gelatinizing solution on the pins, including dipping each pin in the solution to a dip line, to form on each pin a capsule part of thermally gelatinized solution;

drying the gelatinized solution on the pins to form capsule bodies and capsule caps; and removing the capsule bodies and capsule caps from the pins;

wherein drying the gelatinized solution includes maintaining a relationship between water vapor pressure in the capsule part and water vapor pressure in surrounding air such that capsule deformation resulting from excessively rapid drying is avoided.

20. A method according to claim 19, wherein the higher the water vapor pressure in the capsule part, the higher the water vapor pressure in the surrounding air.

\* \* \* \* \*